(12) United States Patent
Honda et al.

(10) Patent No.: US 7,683,956 B2
(45) Date of Patent: Mar. 23, 2010

(54) SOLID-STATE IMAGING DEVICE, DRIVING METHOD THEREOF, AND CAMERA THAT SEPARATE IMAGE COMPONENT SIGNAL AND NON-IMAGE COMPONENT SIGNAL

(75) Inventors: Tomohiro Honda, Kyoto (JP); Yoshiaki Kato, Shiga (JP); Akiyoshi Kohno, Kyoto (JP); Kazuya Yonemoto, Osaka (JP); Toshihumi Habara, Osaka (JP); Kunihide Hirai, Nara (JP)

(73) Assignee: Panasonic Corporation, Osaka (JP)

( * ) Notice: Subject to any disclaimer, the term of this patent is extended or adjusted under 35 U.S.C. 154(b) by 319 days.

(21) Appl. No.: 11/739,254

(22) Filed: Apr. 24, 2007

(65) Prior Publication Data
US 2007/0258004 A1 Nov. 8, 2007

(30) Foreign Application Priority Data
Apr. 25, 2006 (JP) ............................. 2006-120260

(51) Int. Cl.
H04N 5/335 (2006.01)
H04N 9/64 (2006.01)
(52) U.S. Cl. ...................... 348/311; 348/243; 348/248
(58) Field of Classification Search .................. 348/241, 348/243, 248, 245, 249, 250, 311, 312, 316, 348/322
See application file for complete search history.

(56) References Cited

U.S. PATENT DOCUMENTS 6,215,520 B1 * 4/2001 Taniji ......................... 348/249

(Continued)

FOREIGN PATENT DOCUMENTS

EP 0939544 9/1999

(Continued)

OTHER PUBLICATIONS

English Language Abstract of JP 9-298755.

(Continued)

Primary Examiner—Jason Chan
Assistant Examiner—Nicholas G Giles
(74) Attorney, Agent, or Firm—Greenblum & Bernstein, P.L.C.

(57) ABSTRACT

Provided is a solid-state imaging device including a plurality of vertical transfer units (VCCDs), a horizontal transfer unit (HCCD) and a driving unit. In a vertical final stage of the VCCDs, there are same transfer electrode structures in every m columns, where m is equal to or more than 2, the vertical final stage being a vertical transfer stage located the closest to the HCCD, in each vertical final stage of columns except one column among the m columns or of all columns among the m columns, there are transfer electrodes independent from electrodes in the other columns in the m columns, and the independent transfer electrodes are driven independently to perform transfer processing from the corresponding vertical final stage to the HCCD, the driving being independent from driving for the electrodes in the other columns in the m columns, and the driving unit performs sequential vertical transfer driving, by which first packets and second packets are sequentially and vertically transferred within one horizontal transfer period, the first packet including a signal component to be used as an image signal and the second packet not including any signal component to be used as an image signal, and to apply, in the sequential vertical transfer driving, respective transfer pulses to the transfer electrodes in the vertical transfer stage and transfer electrodes of the HCCD, so that the first packets and the second packets are separated to be allocated into respective different horizontal transfer stages of the HCCD.

11 Claims, 34 Drawing Sheets

U.S. PATENT DOCUMENTS

| | | | |
|---|---|---|---|
| 6,686,960 B2 * | 2/2004 | Iizuka | 348/273 |
| 6,885,399 B1 * | 4/2005 | Kawashiri | 348/273 |
| 7,385,638 B2 * | 6/2008 | Parks | 348/311 |
| 2002/0039144 A1 * | 4/2002 | Yamada | 348/311 |
| 2002/0158980 A1 | 10/2002 | Iizuka | |
| 2005/0117043 A1 * | 6/2005 | Fujii et al. | 348/311 |

FOREIGN PATENT DOCUMENTS

| | | |
|---|---|---|
| JP | 9-298755 | 11/1997 |
| JP | 11-234688 | 8/1999 |
| JP | 2000-299817 | 10/2000 |
| JP | 2005-328212 | 11/2005 |

OTHER PUBLICATIONS

English Language Abstract of JP 11-234688.
English Language Abstract of JP 2000-299817.
English Language Abstract of JP 2005-328212.
U.S. Appl. No. 11/621,276 to Kato et al., filed Jan. 9, 2007.
U.S. Appl. No. 11/697,498 to Kato et al., filed Apr. 6, 2007.

* cited by examiner

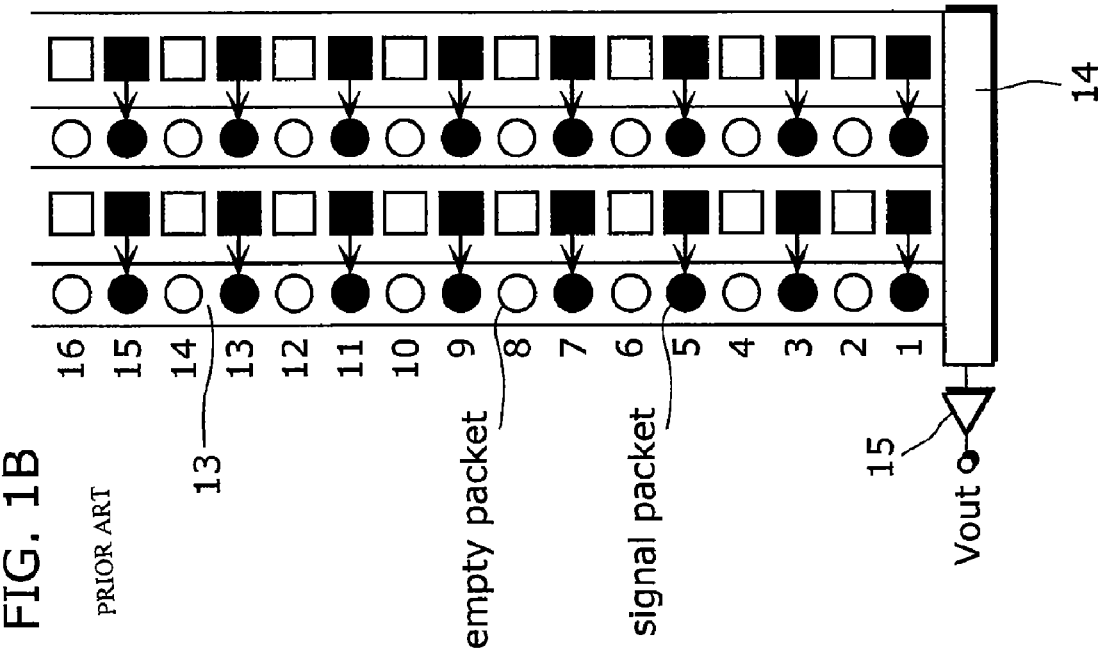
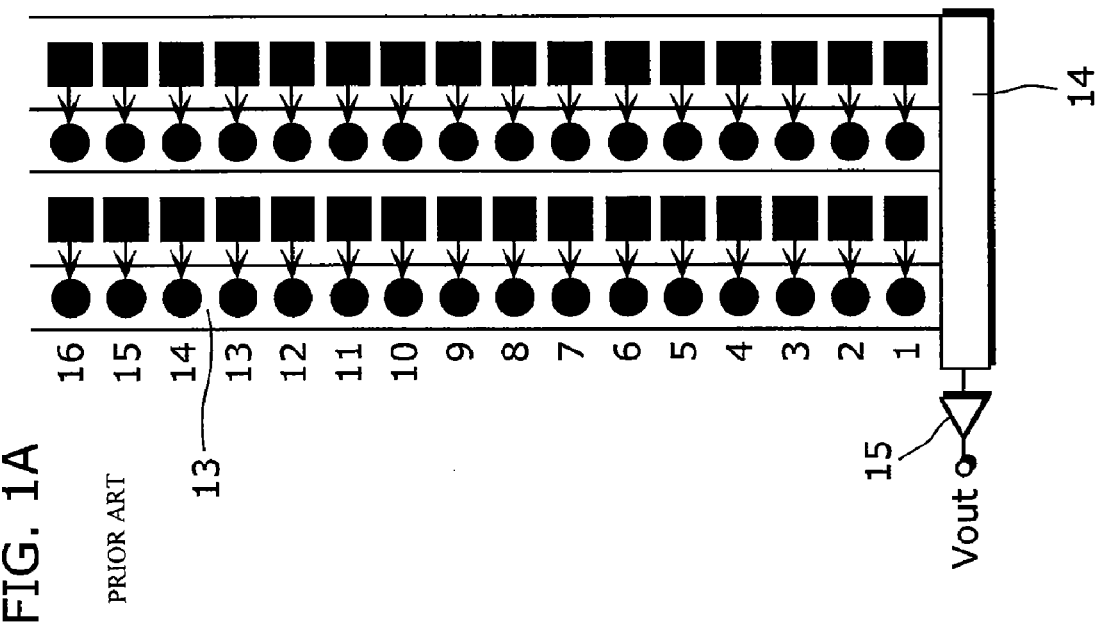

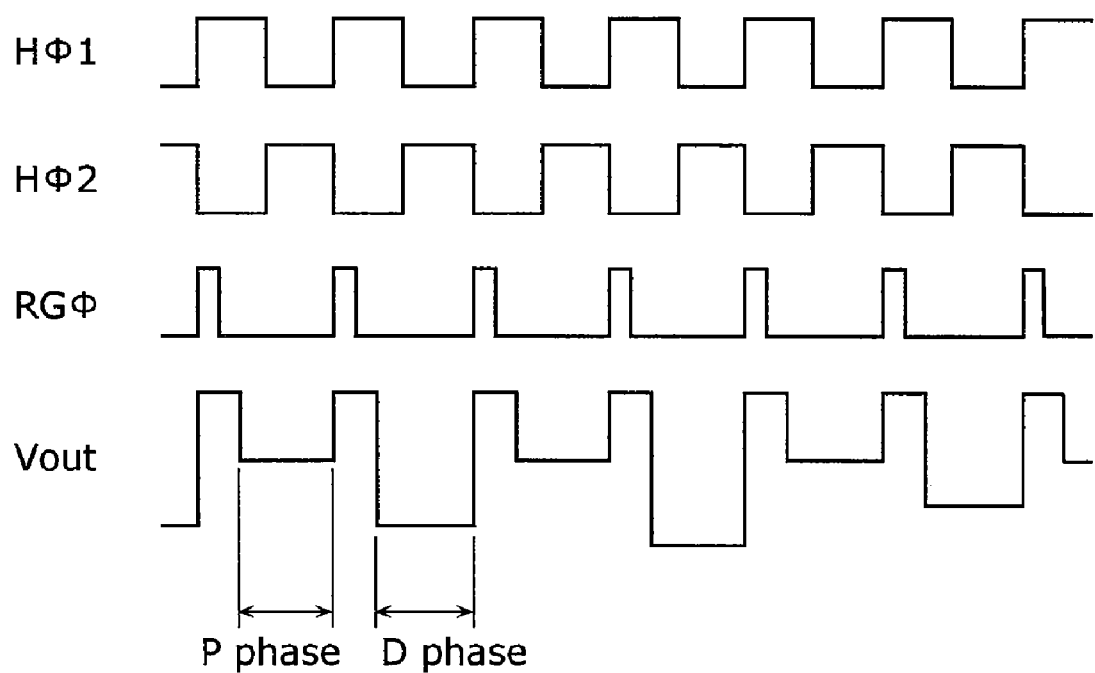

one-bit shifting horizontal transfer one-bit shifting horizontal transfer

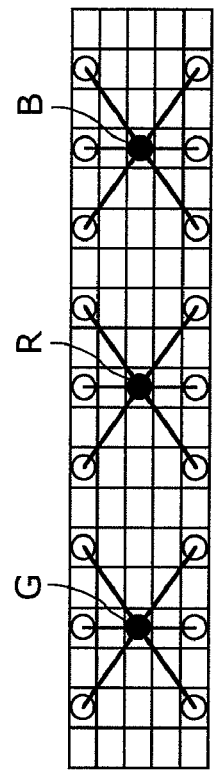
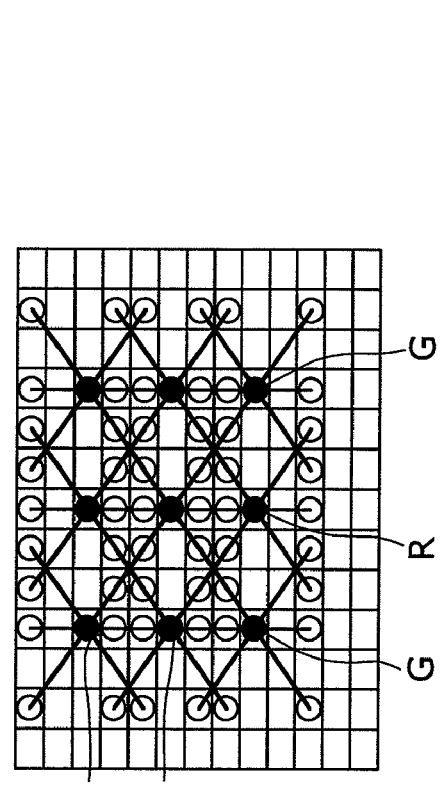
FIG. 31B
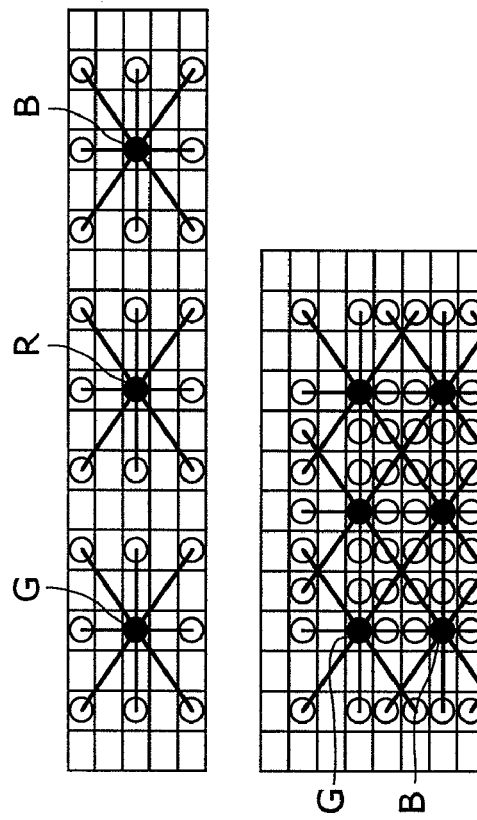
FIG. 31A

SOLID-STATE IMAGING DEVICE, DRIVING METHOD THEREOF, AND CAMERA THAT SEPARATE IMAGE COMPONENT SIGNAL AND NON-IMAGE COMPONENT SIGNAL

BACKGROUND OF THE INVENTION (1) Field of the Invention

The present invention relates to solid-state imaging devices, such as Charge-Coupled Device (CCD) image sensors, and a method of driving the devices, and more particularly to a technology of reducing noise such as smears in pixel thinning driving.

(2) Description of the Related Art

Conventionally, solid-state imaging devices which convert incident light into electronic signals to be outputted as video signals have been known. Cameras, such as digital still cameras, which display as still images the video signals obtained by such solid-state imaging devices have also been known. In recent years, further improved image quality and functions have been demanded in the cameras using the solid-state imaging devices. To satisfy the demands, technologies of high pixel density have been developed.

Regarding such solid-state imaging devices, Japanese Patent Application Publication Nos. 9-298755 and 11-234688 (hereinafter, referred to as Patent References 1 and 2, respectively), for example, disclose a driving method, which makes it possible to reduce the number of pixels in output video signals, by selecting the number of pixels from which signal charges (hereinafter, referred to simply as "charges") are read out in order to reduce the pixels (hereinafter, the selecting is expressed as "thinning"). As a result, a speed of the outputting is increased especially in a preview mode and the like.

However, in such thinning driving, noise components, such as smears and dark currents, are problematic. This problem is explained in detail with reference to FIGS. 1A and 1B.

FIGS. 1A and 1B are schematic diagrams for explaining a problem in a conventional technology disclosed in Japanese Patent Application Publication No. 2000-299817 (hereinafter, referred to as Patent Reference 3). In FIGS. 1A and 1B, white circles represent noise components on a vertical transfer unit, and black circles represents signal components which are transferred once during a horizontal blanking interval.

As shown in FIG. 1A, in driving for reading charges from all pixels (hereinafter, referred to as "all-pixel readout driving"), which is used when still images are captured, for example (hereinafter, referred to as a "still image capture mode"), charges are simultaneously read out from all pixels (shown as black squares) to the vertical transfer unit. Then, the readout charges are independently transferred in a vertical direction without being mixed together in the vertical transfer unit. The transferred charges are then horizontally transferred in a horizontal transfer unit and read out via a charge detection unit.

In the all-pixel readout driving shown in FIG. 1A, during one horizontal blanking interval, each vertical transfer unit can transfer charges from only one pixel to the horizontal transfer unit. Furthermore, an amount of signals outputted at one time from an amplifier is signals of one pixel. An amount of noise outputted at one time from the amplifier is noise of one horizontal transfer stage (a noise amount of one packet). Here, it is assumed that an electronic shutter function is not used even in the all-pixel readout driving.

On the other hand, as shown in FIG. 1B, in driving for reading charges from only selected pixels (hereinafter, referred to as "thinning readout driving"), which is used when captured images are previewed, for example (hereinafter, referred to as a "preview mode"), if the thinning is performed every other pixel in a vertical direction, charges are read out from only pixels in odd-numbered rows (1, 3, 5, . . . in FIG. 1B) to the vertical transfer unit. Here, the vertical transfer unit also transfer empty packets. A pair of one signal packet and one empty packet is transferred in a vertical direction. Then, charges of the two packets are mixed and transferred by the horizontal transfer unit in a horizontal direction, and eventually detected by the charge detection unit.

In the above thinning readout driving shown in FIG. 1B, during a horizontal blanking interval, each vertical transfer unit can transfer charges from two pixels to the horizontal transfer unit. Furthermore, an amount of signals outputted at one time to the amplifier is signals of one pixel. An amount of noise outputted at one time to the amplifier is noise of two horizontal transfer stages (a noise amount of two packets).

As obvious from the above-explained processing, noise is increased by the thinning reading driving of FIG. 1B. The reason is explained in detail below. There are empty packets due to pixels from which charges are not read out, and these empty packets also accumulate noise on the vertical transfer unit. When charges in a pair of two vertical pixels (upper and lower packets) are mixed in the horizontal transfer unit, noise components of these two packets are included in a signal component regarding one pixel. As a result, a signal-to-noise ratio (dB) is increased to double (6 dB).

There have been various proposed technologies to solve the above problem. One of such technologies is disclosed in the Patent Reference 3. The following explains this solution.

FIG. 2 is a schematic diagram showing a solid-state imaging device according to the conventional technology. Here, it is assumed that this solid-state imaging device is a CCD imaging device which generally uses all-pixel readout driving, but can also use thinning readout driving by which thinning is performed every other pixel in a vertical direction.

As shown in FIG. 2, an imaging unit (imaging area) 11 is formed on a semiconductor substrate. The imaging unit 11 includes a plurality of light-receiving elements (pixels) 12 and a plurality of the vertical transfer unit 13. The light-receiving elements 12, such as photodiodes, are arranged by rows and columns in the imaging unit 11. Each of the light-receiving elements 12 converts incident light into signal charges whose amount corresponds to the light amount, and accumulates the charges. Each of the vertical transfer units 13 is arranged along a column of the light-receiving elements 12.

Each vertical transfer unit 13 transfers a set (packet sequence) of signal packets and empty packets. Each of the signal packets corresponds to each pixel. Each of the empty packets is transferred prior to each signal packet. Furthermore, three transfer electrodes (not shown) per one packet are formed on the vertical transfer unit 13 in a direction of transferring packets. Here, the "packet" refers to a unit of transfer on the vertical transfer unit 13. Furthermore, the vertical transfer unit 13 is driven to transfer the packets, by three vertical transfer pulses $V\phi1$, $V\phi2$, and $V\phi3$, for example.

More specifically, during a horizontal blanking interval, the vertical transfer units 13 transfer charges from one row (one line) to the horizontal transfer unit 14, according to the vertical transfer pulses $V\phi1$, $V\phi2$, and $V\phi3$ (hereinafter, this processing is referred to as "line shifting"). Here, a part of the transfer electrodes of the vertical transfer unit 13 serves also as a readout gate electrode, so that one of the vertical transfer pulses $V\phi1$, $V\phi2$, and $V\phi3$ has three different value levels; low, medium, and high. Among the levels, the high value pulse is used as a readout pulse.

Here, the three vertical transfer pulses Vφ1, Vφ2, and Vφ3 are provided to each packet in the thinning readout driving in the different manner as described for the all-pixel readout driving. That is, of course, the readout pulse is not provided to pixels from which charges are not to be read out. Moreover, in the all-pixel readout driving, the line shifting is executed only once per horizontal blanking interval, but in the thinning readout driving, by which thinning is performed every other pixel, the line shifting is executed twice per horizontal blanking interval.

Under the imaging unit 11 of FIG. 2, a horizontal transfer unit 14 is formed adjacent to ends of the vertical transfer units 13. The ends are at the side to which charges are transferred. In the thinning readout driving, the horizontal transfer unit 14 needs to transfer a signal packet and a noise packet as a pair, so that the number of packets arranged in the horizontal transfer unit 14 (a packet sequence) is as twice as the number of pixels in a horizontal direction (double density). The packet sequence is transferred by driven by horizontal transfer pulses Hφ1 and Hφ2 which are reversed phases from each other. Each of the horizontal transfer pulses Hφ1 and Hφ2 is set to have a frequency twice higher than usual, since the horizontal transfer unit 14 has double density.

At an end of the horizontal transfer unit 14, to which charges are transferred, there is a charge detection unit 15, such as a floating diffusion amplifier, which detects the charges transferred from the horizontal transfer unit 14 and converts the charges to a signal voltage to be outputted. The charge detection unit 15 includes a floating diffusion (FD) unit 17, a reset drain (RD) unit 18, and a reset gate (RG) unit 19. The FD unit 17 is formed adjacent to a final output gate 16 of the horizontal transfer unit 14. The RD unit 18 drains the charges. The reset gate 19 discharges the charges from the FD unit 17 to the RD unit 18.

In the charge detection unit 15, the RD unit 18 is applied with a predetermined drain voltage Vrd. The RD unit 19 is applied with the horizontal transfer pulses Hφ1 and Hφ2 and a reset gate pulse RGφ having the same cycles as the horizontal transfer pulses, for example. From the FD unit 17, a output signal voltage Vout converted from charges is obtained. Note that various timing signals including the vertical transfer pulses Vφ1, Vφ2, and Vφ3, the horizontal transfer pulses Hφ1 and Hφ2, and the reset gate pulse RGφ are generated by a timing generation circuit 20.

FIG. 3 is a timing chart showing a timing relationship among the horizontal transfer pulses Hφ1 and Hφ2, the reset gate pulse RGφ, and the output signal voltage Vout. In the waveform of the output signal voltage Vout, P phase is for presetting and D phase is for data outputting. Since the horizontal transfer unit 14 has double density in two-packet units, data of a horizontally prior packet in a packet pair is outputted in P phase, and data of a horizontally subsequent packet in the packet pair is outputted in D phase.

The following describes respective driving processing performed by the above-described CCD imaging device which usually uses all-pixel readout driving, with reference to FIGS. 4A, 4B, and 5A to 5C. FIGS. 4A and 4B are schematic diagrams showing processing performed by the conventional CCD imaging device in the all-pixel readout driving. FIGS. 5A to 5C are schematic diagrams processing performed by the conventional CCD imaging device in the thinning readout driving. In these figures, white circles represent noise components on the vertical transfer unit 13, and black circles represents signal components which are transferred once during a horizontal blanking interval.

Firstly, when the all-pixel readout driving is set by a driving switching signal, the timing generation circuit 20 outputs the vertical transfer pulses Vφ1 to Vφ3 whose timings correspond to the set driving. Thereby, as shown in FIG. 4A, charges are read out simultaneously from all pixels (shown as black squares) to the vertical transfer unit 13.

Subsequently, line shifting is performed in the vertical transfer unit 13. Here, prior to the line shifting, the horizontal transfer unit 14 beforehand shifts one bit (one packet) (hereinafter, referred to as "one-bit shifting") in order to provide charges to a horizontally subsequent packet in a packet pair, since the horizontal transfer unit 13 transfer charges in two-packet units. After that, line shifting is executed once during a horizontal blanking interval. As a result, as shown as FIG. 4B, charges per one line (one row) are provided to the horizontal transfer unit 14.

As described above, the charges per one line provided from the vertical transfer unit 13 to the horizontal transfer unit 14 are transferred in a horizontal direction using the horizontal transfer pulses Hφ1 and Hφ2, and then sequentially inputted to the charge detection unit 15 in units of pixels. In the charge detection unit 15, the reset gate pulse RGφ is supplied to the reset gate unit 19 in the same cycles as the horizontal transfer pulses Hφ1 and Hφ2, thereby reset the reset gate unit 19 to discharge remaining charges from the FD unit 17 to the RD unit 18.

Thereby, from the FD unit 17, an output signal voltage Vout having the waveform shown in FIG. 3 is obtained. Note that, in the all-pixel readout driving, as obvious from the above-described processing, a prior packet in the packet pair is not provided with any data from the vertical transfer unit 13. Therefore, regarding the output signal voltage Vout, no data is outputted in P phase, and data of signal components is outputted in D phase. Note that the P phase becomes a reference phase for signal processing described later On the other hand, when the thinning readout driving is set by a driving switching signal, the timing generation circuit 20 outputs the vertical transfer pulses Vφ1 to Vφ3 whose timings correspond to the set driving. Thereby, as shown in FIG. 5A, charges are read out from only pixels in even-numbered rows (2, 4, . . . in the figures) (shown as black squares) to the vertical transfer unit 13.

Subsequently, the first line shifting is executed in the vertical transfer unit 13 during a horizontal blanking interval. Thereby, charges of noise components per one line are provided from the vertical transfer unit 13 to a horizontally prior packet in the horizontal transfer unit 14. After that, one-bit shifting is executed in the horizontal transfer unit 14.

Next, the second line shifting is executed in the vertical transfer unit 13 during the same horizontal blanking interval. Thereby, charges of signal components per one line are provided from the vertical transfer unit 13 to a horizontally subsequent packet in the packet pair in the horizontal transfer unit 14. As a result, in the horizontal transfer unit 14, the charges of noise components are accumulated in the prior packet, and the charges of signal components are accumulated in the subsequent packet.

As described above, by executing line shifting twice within one horizontal blanking interval, charges of a noise component and charges of a signal component, which are provided from the vertical transfer unit 13 to the horizontal transfer unit 14, are transferred in a pair of packets in a horizontal direction, and sequentially inputted to the charge detection unit 15. The charge detection unit 15 is reset by the reset gate pulse RGφ having the same cycles of the horizontal transfer pulses Hφ1 and Hφ2. As a result, regarding the output signal voltage Vout having the waveform shown in FIG. 3, data of the noise component is outputted in P phase and data of the signal component is outputted in D phase.

By resetting the charge detection unit 15 in the same cycles as the transfer cycles of the horizontal transfer unit 14, resetting between P and D phases are also executed. As a result, data of a noise component per one packet is outputted in P phase, and data of signal and noise components per one packet is outputted in the D phase.

As described above, in the CCD imaging device basically using the all-pixel readout driving, when the thinning readout driving is set, charges are transferred in a pair of a signal packet and an empty packet in a horizontal direction, then the horizontally transferred charges are sequentially converted into electronic signals, and data of a noise component in the empty packet is outputted in P phase and data of a signal component in the signal packet is outputted in D phase. Thereby, it is possible to obtain a combination of (i) data of a pixel and (ii) data of noise in the same column of the pixel, in other words, data of noise in the horizontally same address as the pixel.

Therefore, in subsequent signal processing, by eliminating difference between the signal component in D phase and the noise component in P phase, it is possible to cancel noise component included in the signal component. Note that the noise component in the empty packet is smears, dark currents, and the like, which is noise in the same direction as the vertical transferring.

Moreover, Japanese Patent Application Publication No. 2005-328212 (hereinafter, referred to as Patent Reference 4) discloses a technology of removing smear components by detecting in a latter circuit the difference between (i) a signal component and a noise component read out from a readout pixel and (ii) a noise component included in an empty packet, and of forming a transfer blocking gate at a final part of a vertical transfer path. With the technology, it is possible to thin pixels not only in a vertical direction, but also in a horizontal direction.

SUMMARY OF THE INVENTION

However, the processing disclosed in Patent References 3 and 4 have various problems as followings.

Firstly, the method disclosed in Patent Reference 3 cannot be applied to thinning readout driving in a horizontal direction. For example, the following examines the case where the thinning is performed every other pixel arranged in a horizontal direction, in other words, every other column. In the method disclosed in Patent Reference 3, charges of signal components are transferred from the vertical transfer units to the horizontal transfer unit, then the horizontal transfer unit executes one-bit shifting to receive charges of noise components in empty packets from the vertical transfer units, so that each empty packet is transferred to a horizontal transfer stage subsequent to each signal packet in the horizontal transfer unit 14. As a result, it is possible to separate the signal component from the noise component. However, when the horizontal thinning readout driving is applied to the above conventional method, in the same row from which signal charges are read out, there are signal packets and empty packets alternately. Further, in the thinned row from which signal charges are not read out, there are only empty packets. Therefore, even if a horizontal bit shifting is executed every charge transfer from the vertical transfer unit to the horizontal transfer unit as described above, it is not possible to separate signal packets from empty packets.

Secondly, in the method disclosed in Patent Reference 3, the horizontal transfer unit needs to have horizontal transfer stages whose number is twice more than the number of pixels in one row (double density), so that an area of the horizontal transfer unit per one vertical transfer unit (column) is increased, which is not suitable for miniaturization of the solid-state imaging device. Furthermore, the capacity becomes too large compared to a saturated charge amount, which would cause signal waveform rounding, as transfer deterioration, in high-speed transfer.

Thirdly, the method disclosed in Patent Reference 3 needs to set a frequency of driving the horizontal transfer unit to twice higher than a normal frequency, which makes a structure of a driving circuit complicated and also increases power consumption.

Fourthly, the method disclosed in Patent Reference 4 needs to transfer signal packets and empty packets separately in a horizontal direction, which makes it impossible to reduce the number of horizontal transfers for achieving high-speed driving. Furthermore, the method of setting the number of packets in one horizontal transfer to double density results in the same problems as described for Patent Reference 3.

Moreover, it is also disclosed to separate a signal packet from an empty packet which are obtained from the same column, by forming a transfer blocking gate depending on the number of thinned pixels in a horizontal direction. For example, it is conceivable that a drain for the discharging is formed near the transfer blocking gate, or that the blocked charges are horizontally transferred to another way to be discharged. However, these solutions are not realistic, because the former solution needs a structure which makes the device miniaturization difficult, and the latter solution needs another horizontal transfer for discharging unnecessary charges and thereby this solution is not suitable for high-speed processing. Furthermore, signal components, which are not transferred to the horizontal transfer unit by the transfer blocking gate, are directly discarded, so that the signal components cannot be efficiently used to increase image quality, for example.

In order to address the above problems, an object of the present invention is to provide a solid-state imaging device and a driving method thereof, which significantly reduce noise such as smears even in driving by which pixels are thinned in a horizontal direction, thereby eventually obtaining high-quality images.

In order to solve the above problems, the solid-state imaging device according to the present invention includes: a plurality of vertical transfer units each of which is arranged corresponding to each column of pixels and vertically transfers charges read out from the pixels, the overall pixels being arranged two-dimensionally by rows and columns; a horizontal transfer unit which horizontally transfers the charges obtained from the vertical transfer units; and a driving unit which drives the vertical transfer units and the horizontal transfer unit, wherein, in a vertical final stage of the vertical transfer units, there are same transfer electrode structures in every m columns, where m is an integer number equal to or more than 2, the vertical final stage being a vertical transfer stage located the closest to the horizontal transfer unit, in each vertical final stage of columns except one column among the m columns or of all columns among the m columns, there are transfer electrodes independent from electrodes in the other columns in the m columns, and the independent transfer electrode is driven independently to perform transfer processing from the corresponding vertical final stage to the horizontal transfer unit, the driving being independent from driving for the electrodes in the other columns in the m columns, and the driving unit performs sequential vertical transfer driving, by which first packets and second packets are sequentially and vertically transferred within one horizontal transfer period, the first packet including a signal component to be used as an image signal and the second packet not including any signal component to be used as an image signal, and to apply, in the sequential vertical transfer driving, respective transfer pulses to the transfer electrodes in the vertical transfer stage and transfer electrodes of the horizontal transfer unit, so that the first packets and the second packets are separated to be allocated into respective different horizontal transfer stages of the horizontal transfer unit.

Here, it is preferable that the number of the first packets allocated into one horizontal transfer stage of the horizontal transfer unit is equal to or less than m−1, as a result of the allocating of the first packet and the second packet into the horizontal transfer unit.

Further, it is preferable that the solid-state imaging device further includes a color filter corresponding to each pixel.

Furthermore, it is preferable that the color filters are arranged in Bayer pattern.

The driving method according to the present invention is used for a solid-state imaging device that has at least a preview mode, as an image capture mode. By the driving method, pixels are thinned in vertical and horizontal directions. The driving method includes: transferring first packets and second packets by vertical transfer units which vertically transfer charges read out from two-dimensionally arranged pixels, the first packet including a signal component to be used as an image signal and the second packet not including any signal component to be used as an image signal; transferring charges included in the second packets in vertical transfer units in arbitral columns, to respective predetermined horizontal transfer stages of the horizontal transfer unit which horizontally transfers the charges obtained from the vertical transfer units; transferring charges included in the first packet in the vertical transfer unit, to a horizontal transfer stage which is different from the predetermined horizontal transfer stage of the horizontal transfer unit; and transferring horizontally the charges in the respective horizontal transfer stages of the horizontal transfer unit, and obtaining an output signal.

Here, it is preferable that the charges are added together in the vertical transfer units when the charges are read out from the pixels, and the added charges are transferred to the horizontal transfer unit.

Further, it is preferable that in the transferring of the charges included in the first packet, charges of a plurality of the first packets are sequentially transferred in the vertical transfer unit.

Furthermore, it is preferable that the driving method further includes mixing the charges of the first packet and the charges of the second packet in a vertical final stage of the vertical transfer unit, the vertical final stage being located the closest to the horizontal transfer unit among other vertical transfer stages.

A camera according to the present invention includes: the solid-state imaging device mentioned above; an optical system including a lens which is operable to focus incident light from an object on an imaging area of the solid-state imaging device; a control unit operable to control driving of the solid-state imaging device; and an image processing unit operable to apply signal processing to an output signal from the solid-state imaging device.

Here, it is preferable that the camera further includes a memory in which the output signal is stored.

Further, it is preferable that the signal processing unit is operable to obtain difference between signals which have a same signal component amount and have different noise components, and to cancel the noise components in the output signal using a signal component per one pixel which is calculated from the difference, and is to eventually obtain an image signal.

According to the solid-state imaging device of the present invention, it is possible to significantly reduce noise such as smears in charges, in (i) thinning readout driving by which charges are readout from pixels thinned in vertical and horizontal directions, and (ii) multiple-pixel mixing driving by which charges of multiple pixels are mixed, thereby eventually obtaining high-quality images even when the images are in a preview mode.

FURTHER INFORMATION ABOUT TECHNICAL BACKGROUND TO THIS APPLICATION

The disclosure of Japanese Patent Application No. 2006-120260 filed on Apr. 25, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the present invention. In the Drawings:

FIGS. 1A and 1B are schematic diagrams showing how charge are transferred, in use for explanation of the problems in the conventional technology;

FIG. 3 is a timing chart showing a timing relationship among the horizontal transfer pulses H$\phi$1 and H$\phi$2, the reset gate pulse RG$\phi$, and the output signal voltage Vout according to the conventional technology;

FIGS. 13A and 13B are diagram each showing arrangement of packets whose pixels are able to be added together vertically in the solid-state imaging device according to the first embodiment of the present invention;

FIG. 13C is a diagram showing arrangement of packets whose pixels are not able to be added together vertically;

FIGS. 31A and 31B are diagrams showing how to combine pixels to be mixed (mixed pixel groups) in the solid-state imaging device according to the third embodiment of the present invention;

DESCRIPTION OF THE PREFERRED EMBODIMENT(S)

The following describes preferred embodiments according to the present invention with reference to the drawings.

Prior to details of the embodiments, basic structure and driving method of the solid-state imaging device according to the present invention are explained below.

(Structure of Solid-State Imaging Device)

Figure 2:
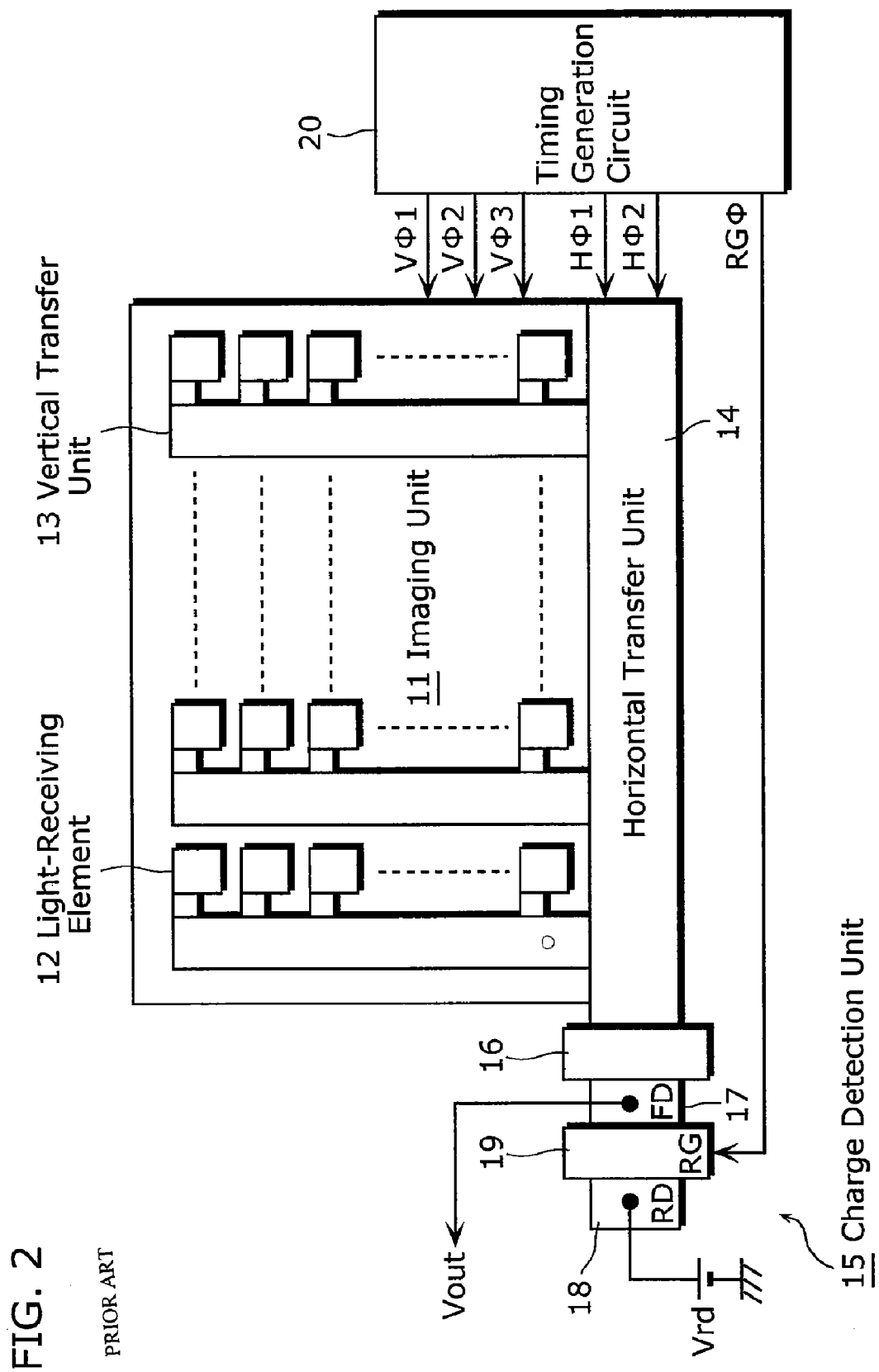
FIG. 2 is a schematic diagram showing a solid-state imaging device according to the conventional technology.
Figure 4A:
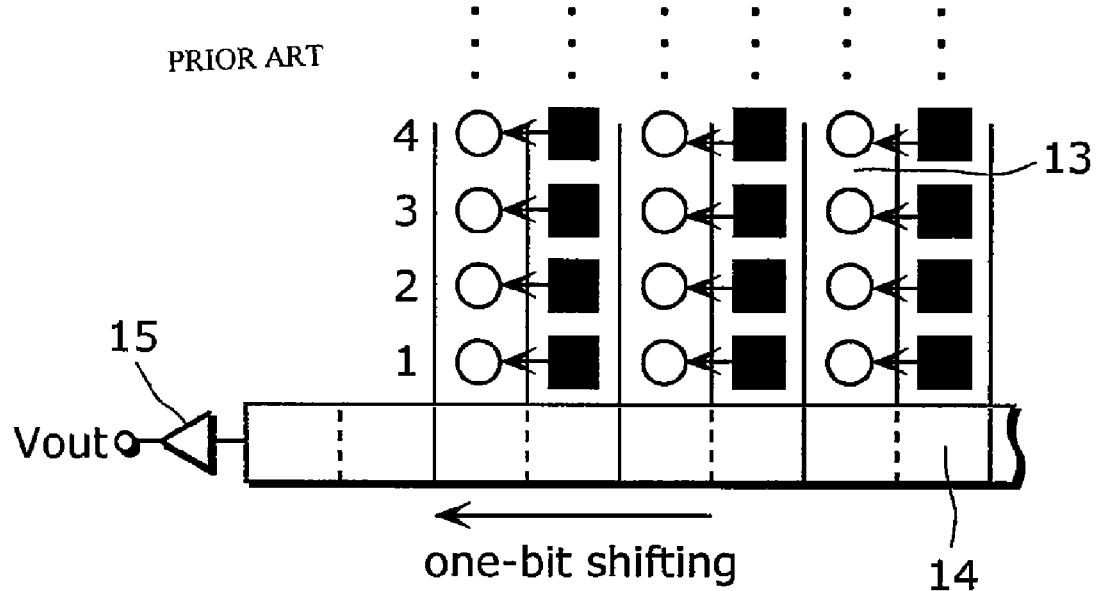
FIGS. 4A and 4B are diagrams showing processing performed by the conventional CCD imaging device in all-pixel readout driving.
Figure 4B:
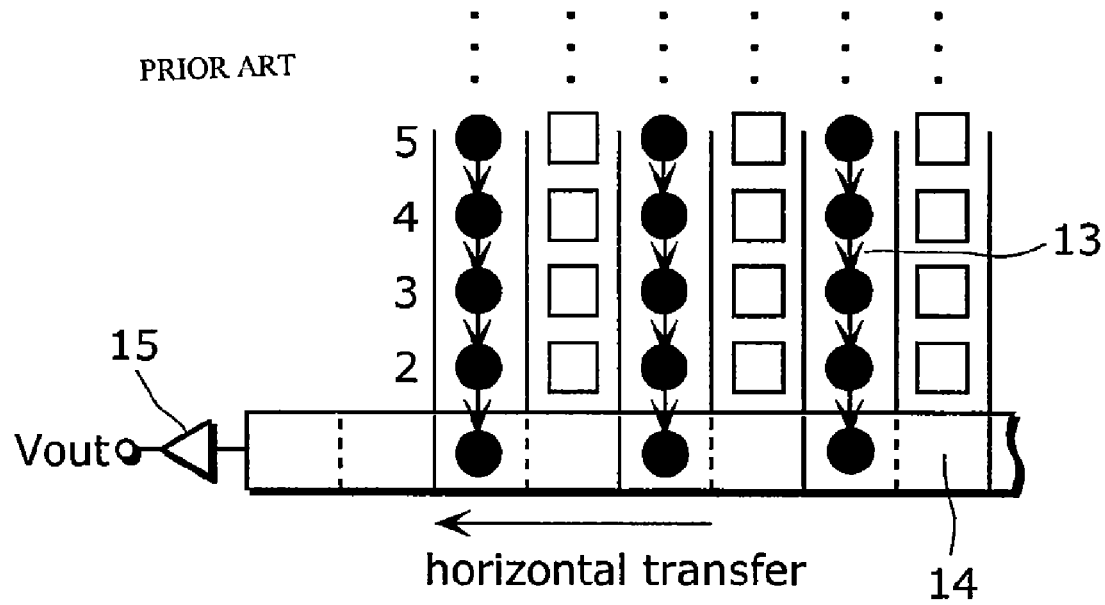
Figure 5A:
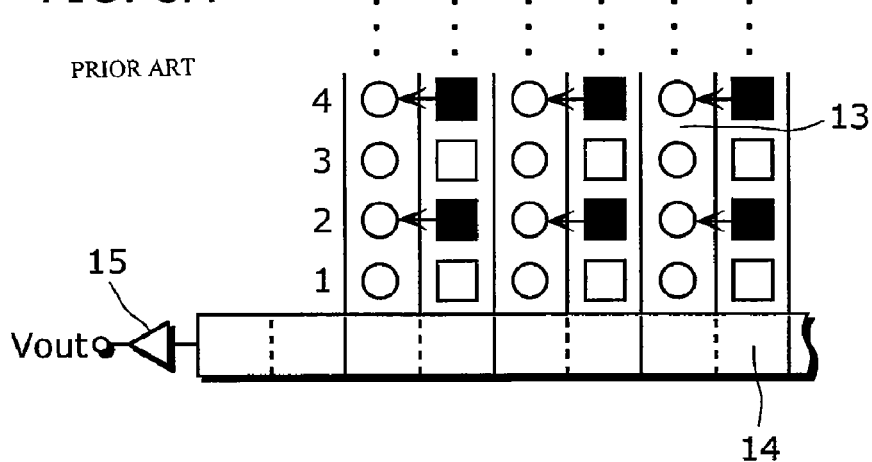
FIGS. 5A to 5C are diagrams showing processing performed by the conventional CCD imaging device in thinning readout driving.
Figure 5B:
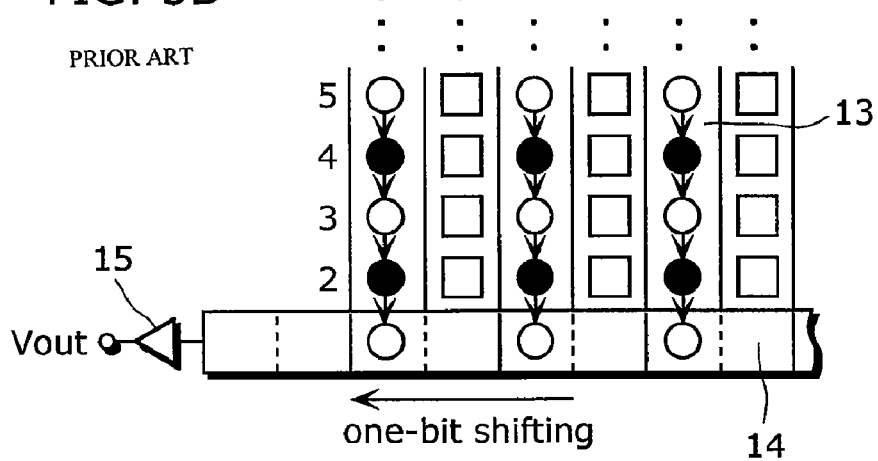
Figure 5C:
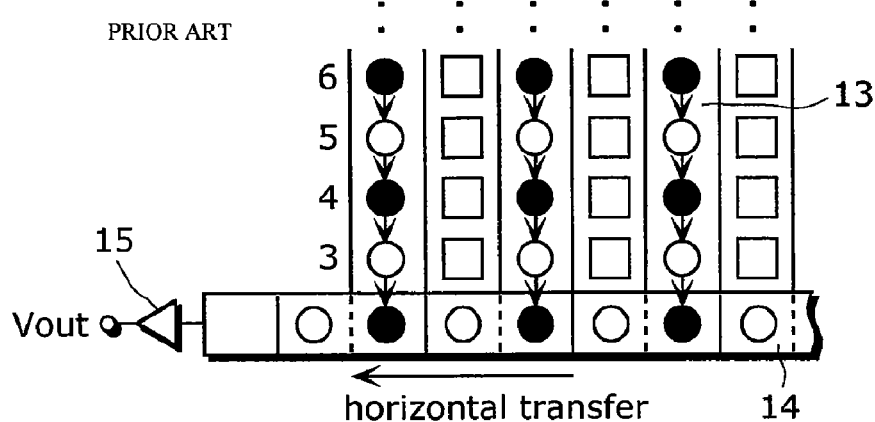
Figure 6:
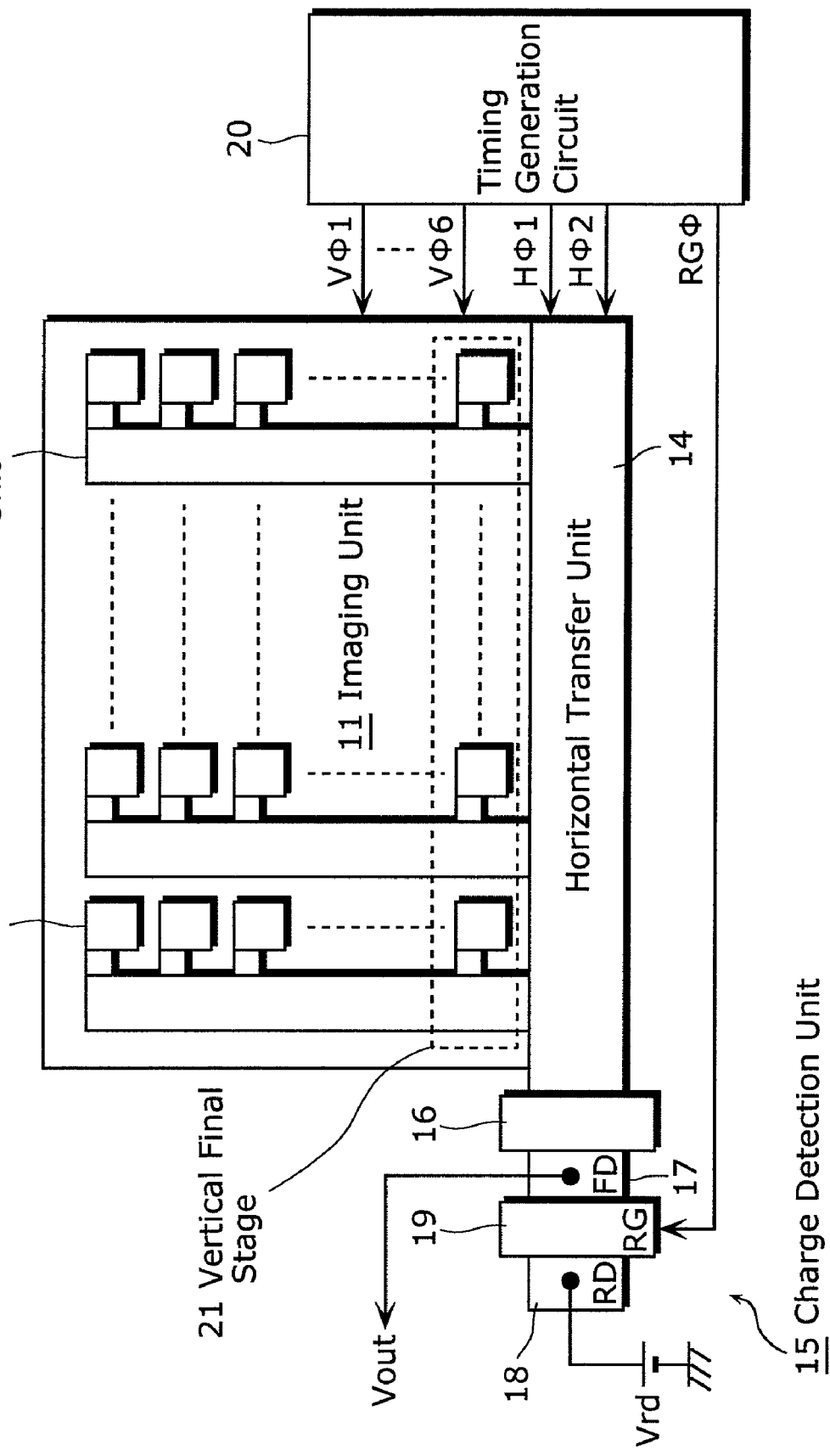
FIG. 6 is a schematic diagram showing a structure of a solid-state imaging device according to the present invention.

The following describes a basic structure of the solid-state imaging device according to the present invention. FIG. 6 is a schematic diagram showing the structure of the solid-state imaging device according to the present invention. The structure of FIG. 6 is similar to the structure of FIG. 2, but differs from the structure of FIG. 2 in that there are basically six vertical transfer pulses and six vertical transfer electrodes to drive the vertical transfer unit 13, and that vertical transfer electrodes in a final stage (vertical final stage 21) in vertical transfer stages of the vertical transfer unit 13 have a structure different from a structure of the other vertical transfer stages. Note that the reference numerals in FIG. 2 are assigned to identical units in FIG. 6 so that the details of those units are same as described above. Note also that, regarding the structure of FIG. 6, a RGB primary color filter array (not shown) is formed above the device in patterns where each color filter is arranged above every two pixels in a matrix. That is, the color filters is arranged in the known Bayer pattern, where if one unit has, for example, total four pixels of vertical two pixels and horizontal two pixels, a lower-left pixel is R (red), lower-right and upper-left pixels are G (green), and an upper-right pixel is B (green). The above-explained color filters are used in solid-state imaging devices according to the embodiments.

Figure 7A:
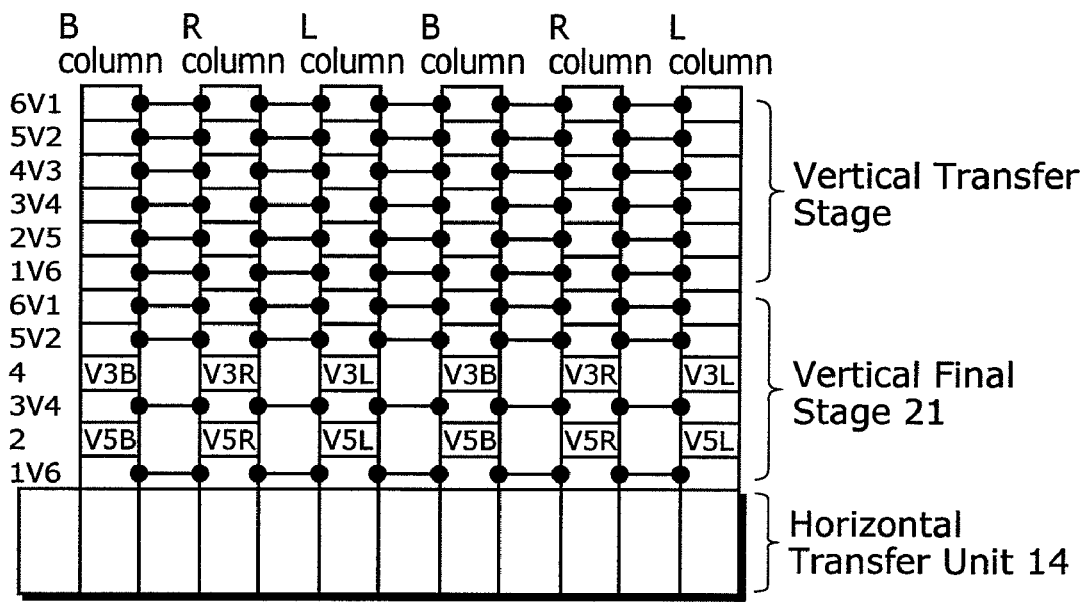
FIGS. 7A and 7B are diagrams each showing a structure of vertical transfer electrodes of the solid-state imaging device according to the present invention.

Next, a structure of the vertical transfer electrodes in the vertical transfer unit 13 is described. FIG. 7A shows the structure of the vertical transfer electrodes of the solid-state imaging device according to the present invention. As described above, a group of six phases of vertical transfer electrodes (common electrodes) V1 to V6 form one vertical transfer stage. A plurality of such vertical transfer stages are repeatedly arranged to form total vertical transfer electrodes in the vertical transfer unit 13 as shown in FIG. 7A. Here, for vertical-thinning readout driving, readout electrodes correspond to respective readout pixels are independent from any other electrodes and driven independently. Furthermore, electrodes in the vertical final stage 21 has a structure different from the other vertical transfer stages. More specifically, transfer performed in the vertical final unit 21 needs to be independent from the other vertical transfer stages, so that in respective vertical final stages 21, third-phase and fifth-phase electrodes V3B, V3R, V3L, V5B, V5R, and V5L are not the common electrodes but different independent electrodes.

With the above electrode structure, the vertical final stage 21 can perform transfer processing independently, differing from the other vertical transfer stages.

Figure 7B:
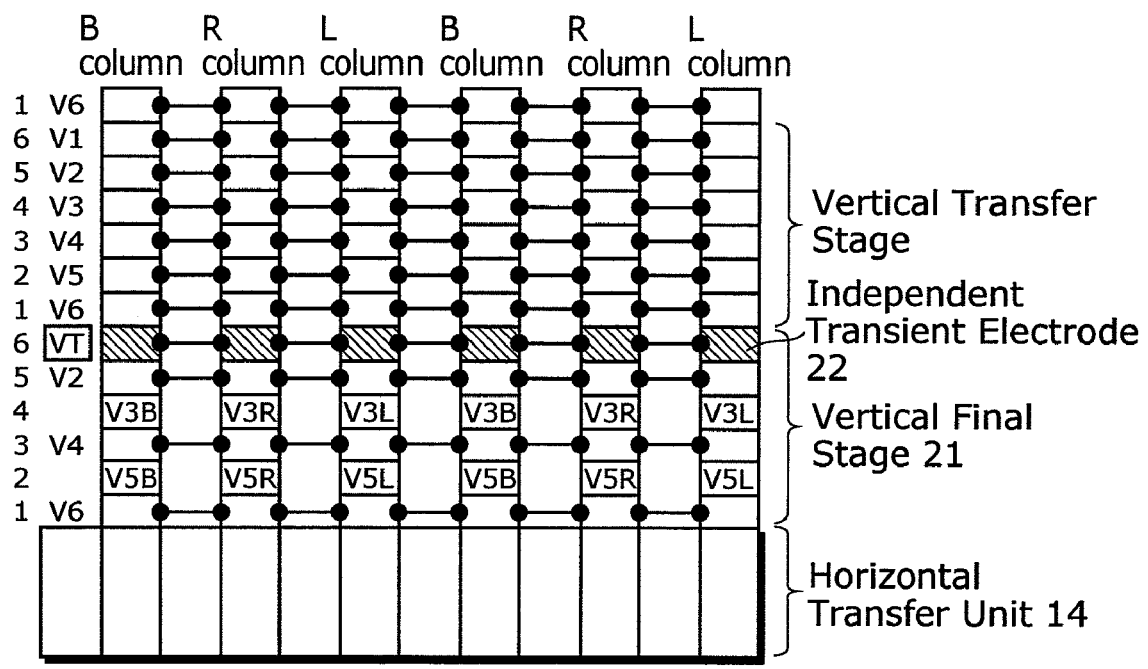

Moreover, as shown in FIG. 7B, it is also possible to set the first-phase electrode V1 among the six electrodes in the vertical final stage 21, which is the farthest electrode from the horizontal transfer unit 14, to an independent transient electrode 22. Thereby, the first-phase electrode V1 can independently perform transfer processing which differs from other first-phase electrodes V1 in the other vertical transfer stages.

With the structure of FIG. 7B, it is possible to increase a charge amount capacity in the vertical transfer unit 13, more than the structure of FIG. 7A.

Note that the electrode structures shown in FIGS. 7A and 7B are conventional technologies disclosed in more detail in Japanese Patent Application Publication Nos. 2004-180284 and 2006-14075.

(Thinning Readout Driving and Noise)

Figure 8C:
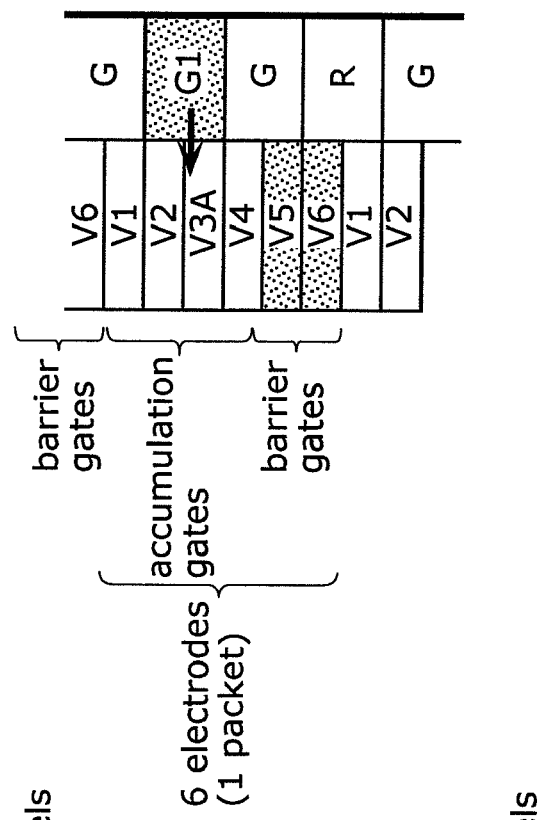
FIG. 8C is a diagram showing a positional relationship between barrier electrodes and accumulation electrodes in a group of transfer electrodes, according to the present invention.
Figure 8B:
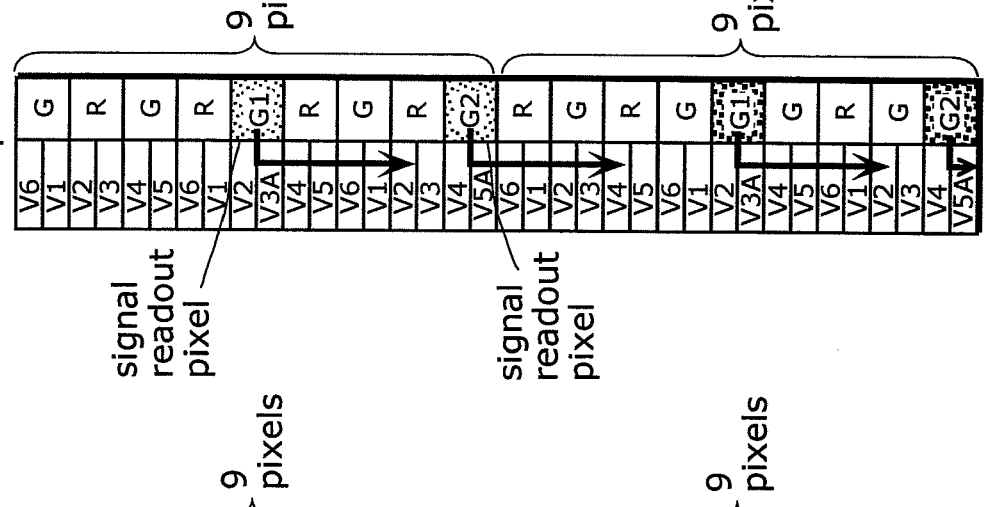
FIGS. 8A and 8B are diagrams each showing a positional relationship between the transfer electrodes and pixels from which charges are read out, according to the present invention.
Figure 8A:
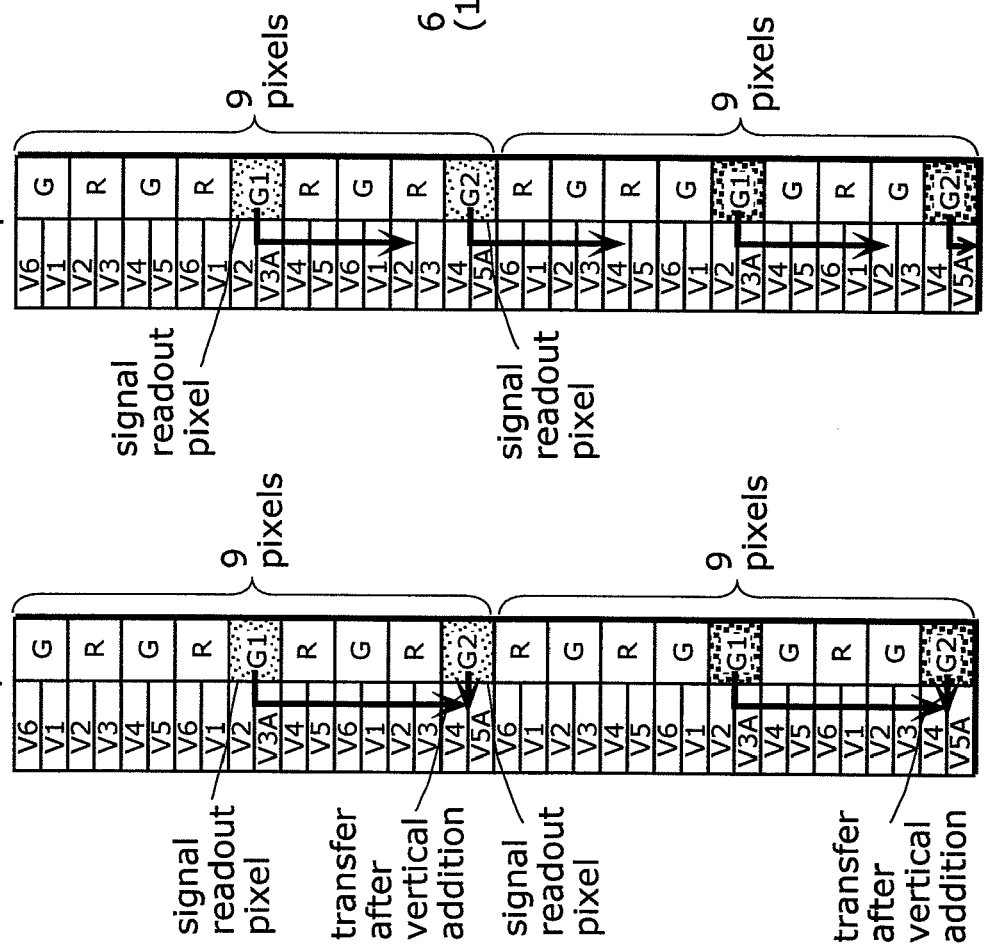

The following describes a basic driving method of the solid-state imaging device according to the present invention. Arrangement relationships among pixels and vertical transfer electrodes in the thinning readout driving are explained with reference to FIGS. 8A to 8C. FIG. 8A shows an arrangement relationship among vertical transfer electrodes and pixels from which charges are read out, in the case where charges of two pixels are added together in the vertical transfer unit 13. FIGS. 8B shows an arrangement relationship among vertical transfer electrodes and pixels from which charges are read out, in the case where charges of respective pixels are separately transferred in the vertical transfer unit 13. FIGS. 8C shows an arrangement relationship among barrier electrodes and accumulation electrodes within a group of vertical transfer electrodes.

Here, it is assumed that charges are read out from two pixels within nine pixels arranged in a horizontal direction in the thinning readout driving. It is also assumed that the third-phase and firth-phase electrodes V3A and V5A, which correspond to pixels from which charges are read out, are independent from the other electrodes and driven independently. This means that the electrode structure in the normal vertical transfer stages other than the vertical final stage 21 shown in FIGS. 7A and 7B is the same cyclic structure shown in FIGS. 8A to 8C.

Next, processing of reading and transferring charges is described.

As shown in FIG. 8A, charges read from a pixel G1 is transferred along the vertical transfer unit 13, and then added to charges read from a pixel G2 in the vertical transfer unit 13. This adding is executed when charges are read out from the pixel G2 to the vertical transfer unit 13. The added charges are further transferred and provided to the horizontal transfer unit 14. Likewise, charges read out from a pixel R1 and charges read out from a pixel R2 are added together in the vertical transfer unit 13, and then provided to the horizontal transfer unit 14.

As another example, as shown in FIG. 8B, charges read out from pixels G1 and G2 are separately transferred to the vertical transfer unit 13 to be provided to the horizontal transfer unit 14.

As still another example, as shown in FIG. 8C, charges read out from a pixel is accumulated at four gates (accumulation gates) of vertical transfer electrodes V1, V2, V3A, and V4. Here, vertical transfer electrodes V5 and V6 serve as barrier gates. The charges include a pure signal component read out from a photodiode, and also a noise component such as smears and dark currents. Note that the charges accumulated at the accumulation gates of the vertical transfer electrodes V1, V2, V3A, and V4 are corresponding to previously-mentioned one packet.

Using the six phases of gate electrodes, it is possible to increase the number of gates for accumulating charges, and also to increase an amount of charges which are able to be transferred in the vertical transfer unit 13.

Next, noise caused in the vertical transfer is explained in more detail below. The noise components, such as smears and dark currents, occur in each transfer packet during vertical transfer. For example, quasi-signals generated due to light leakage from pixels are added as smears to transferred packets, and electrons induced from heat and the like become quasi-signals and are added as dark currents to transferred packets. During transferring charges of all pixels in a vertical direction of one image in each field, noise are sequentially added together during the vertical transfer, so that in transfer of the horizontal transfer unit 14, respective packets corresponding to the same column have almost equal noise components.

Whatever a component in a transfer packet is, a noise component is added to the transfer packet during vertical transfer, as far as the transfer packet has an enough capacity for the total charges.

A level of noise suppression (noise suppression level) is generally expressed as a logarithm expression of a noise-to-signal ratio. For example, the noise suppression level is expressed as the following equation 1.

(noise suppression level)=20×log ((noise)/(signal))     (equation 1)

A degree of noise improvement (noise improvement degree) is also expressed as a ratio as the following equation 2.

(noise improvement degree)=20×log (noise improvement ratio)     (equation 2)

The noise improvement is understood by the above equation. The noise improvement can be achieved not only by reducing noise components, but also by increasing a ratio of signal components to noise components.

Furthermore, using the reading and transferring processing shown in FIG. 8A, when charges of two pixels are added together, charges of the second pixel, which are to be added to, do not include any noise components, which makes it possible to reduce a ratio of noise components to signal components. In more detail, in the reading and transferring shown in FIG. 8A, charges of two pixels are provided into one vertical transfer packet when the charges are read out from the pixels, and the readout charges are vertically transferred per one packet corresponding to two pixels, so that a ratio of signal components to noise components becomes double as described previously. Therefore, in this reading and transferring processing, it is possible to improve the noise suppression level.

Moreover, without any specific notes, it is assumed in the following embodiments that the thinning readout driving shown in FIG. 8A is always performed by reading charges from two pixels within nine pixels in a vertical direction, and adding charges of two pixels together as a unit of transfer in the vertical transfer unit 13.

First Embodiment

The following describes a solid-state imaging device and a driving method of the device, according to the first embodiment of the present invention. The structure of the solid-state imaging device of the first embodiment is the same as the previously-described structure shown in FIGS. 6, 7A, 7B, and 8A.

Figure 9:
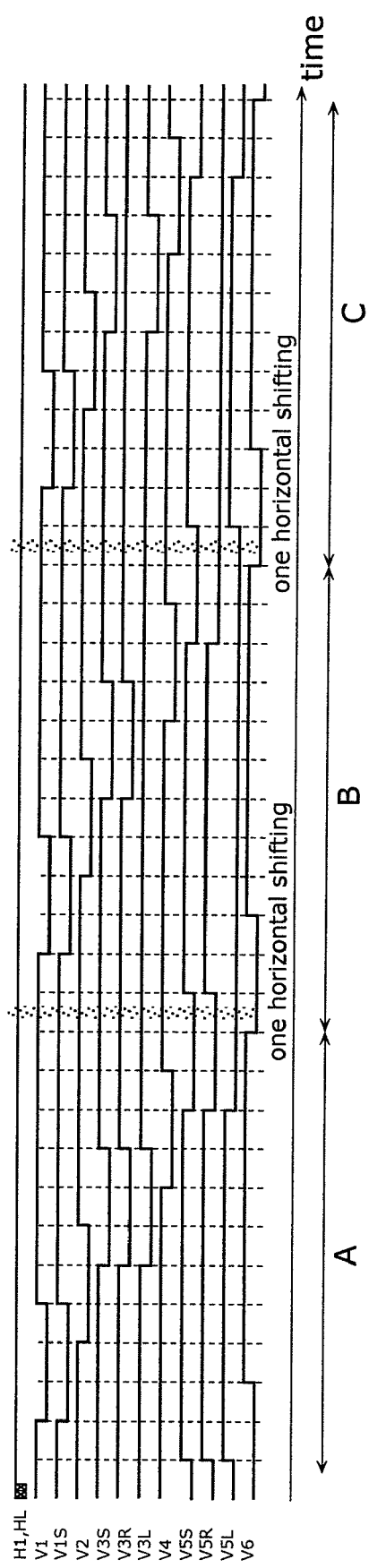
FIG. 9 is a timing chart of vertical and horizontal transfer pulses of the solid-state imaging device according to the first embodiment of the present invention.
Figure 10:
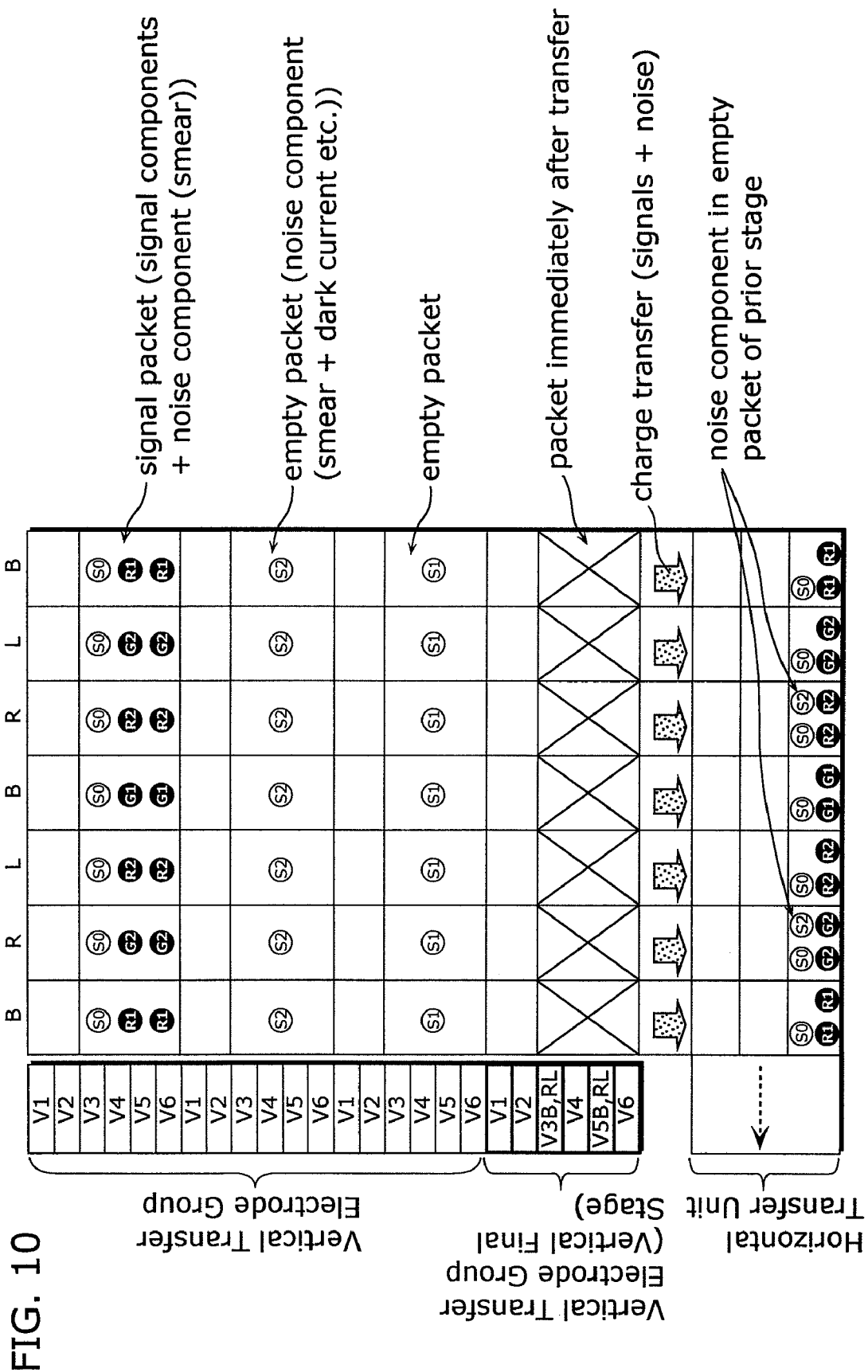
FIG. 10 is a diagram showing how charges are transferred in vertical and horizontal transfer units in the solid-state imaging device according to the first embodiment of the present invention.
Figure 11:
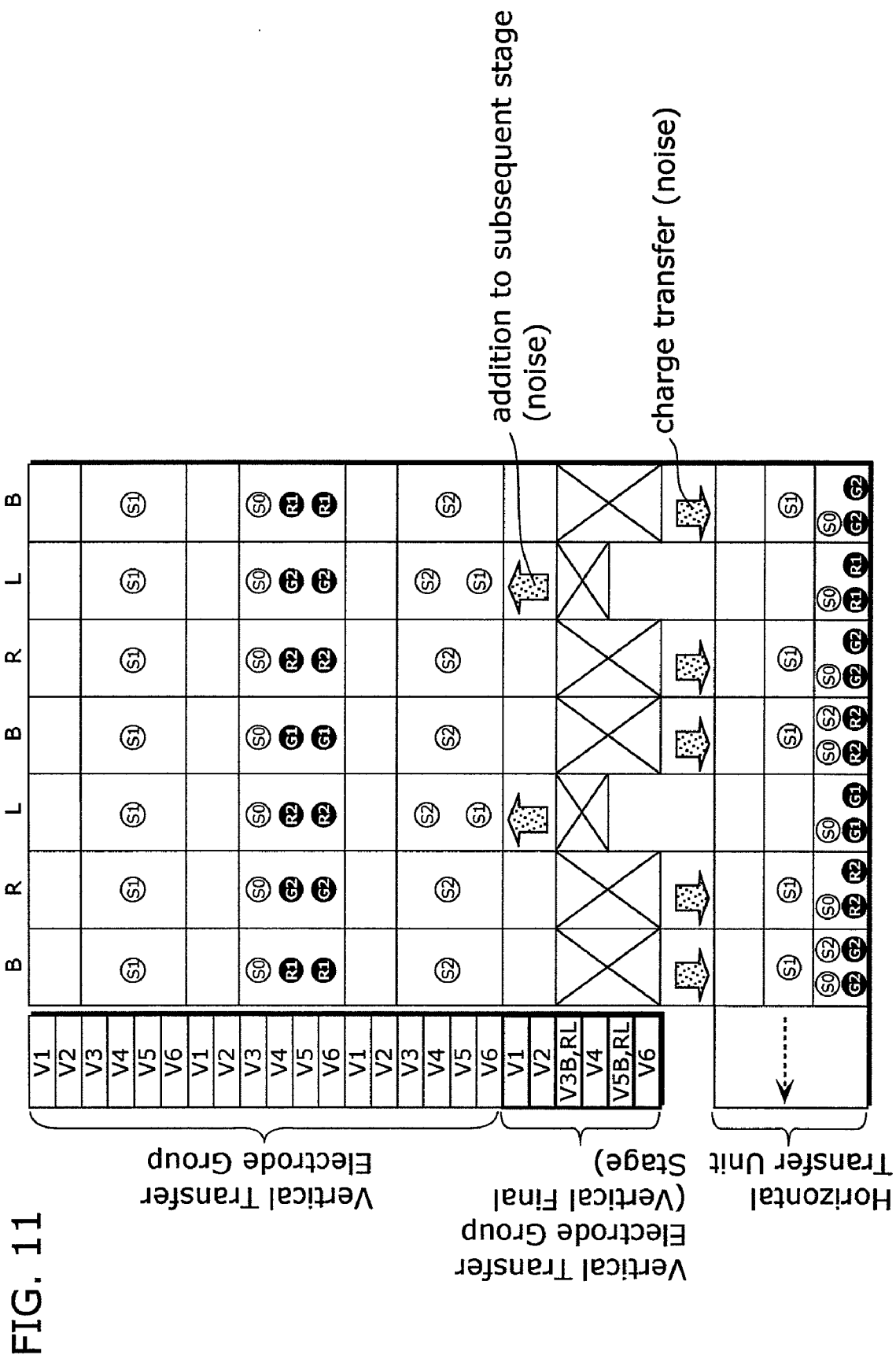
FIG. 11 is a diagram showing how charges are transferred in the vertical and horizontal transfer units in the solid-state imaging device according to the first embodiment of the present invention.
Figure 12:
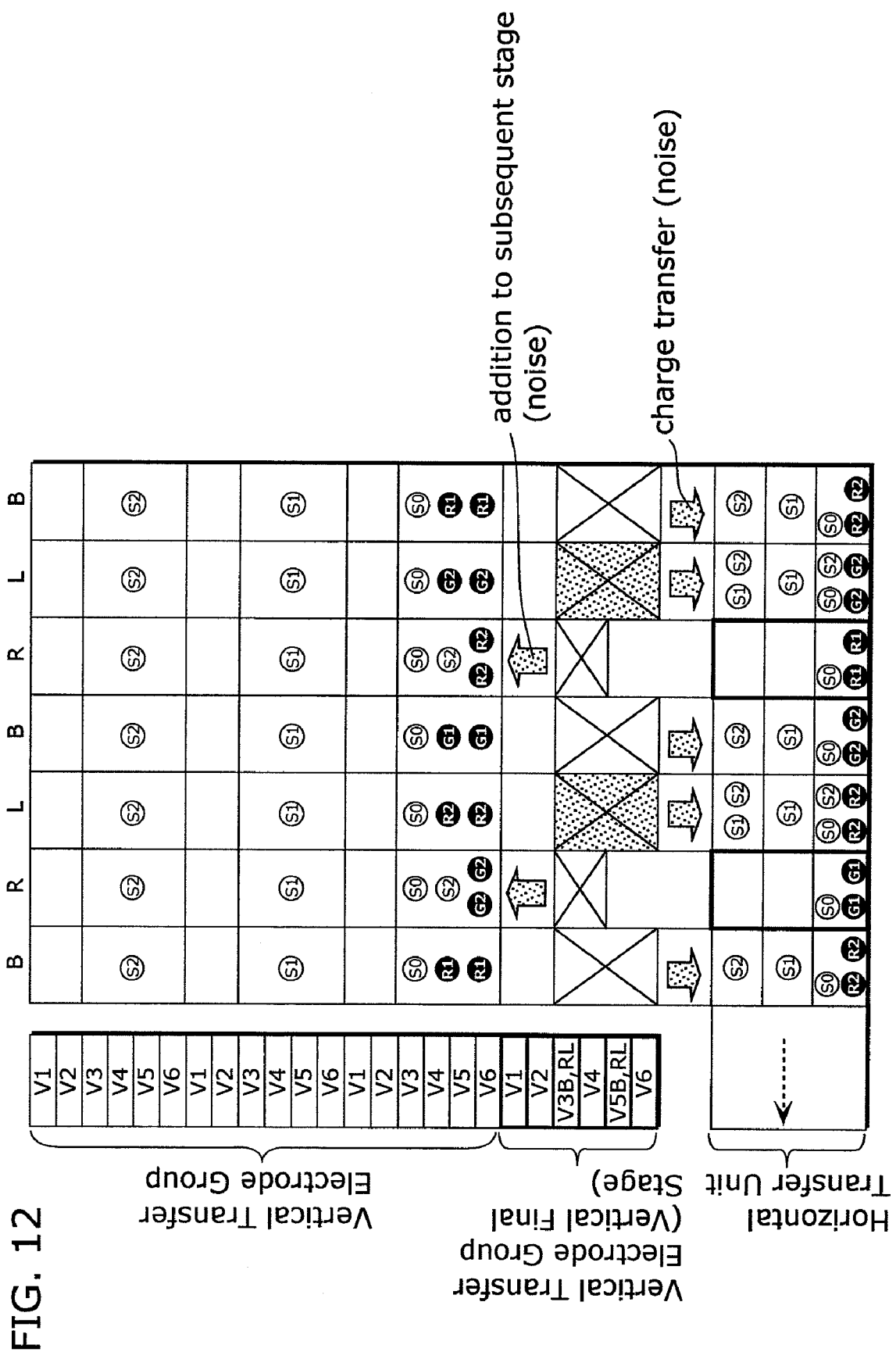
FIG. 12 is a diagram showing how charges are transferred in the vertical and horizontal transfer units in the solid-state imaging device according to the first embodiment of the present invention.

FIG. 9 is a timing chart of vertical transfer pulses in the vertical final stage 21 and horizontal transfer pulses, in the solid-state imaging device of the first embodiment of the present invention. FIGS. 10 to 12 are diagrams showing how charges are transferred in the vertical transfer unit 13 and the horizontal transfer unit 14.

The following describes, as one example, how signal components and noise components are transferred by thinning readout driving of the solid-state imaging device according to the first embodiment. In this thinning readout driving, which follows the previously-described thinning readout driving in a vertical direction, charges are read from one pixel among three cycled pixels (B column, R column, L column) in a horizontal direction.

Firstly, as shown in FIG. 10, vertical transfer electrodes in the vertical final stage 21 are driven to transfer charges in one packet in a vertical transfer stage, so that the charges are provided to the horizontal transfer unit 14. Here, in the case of a R column, the charges provided to the horizontal transfer unit 14 include signal components from two pixels (2×G1 or 2×R1) and a noise component from one pixel (S0). Here, the noise component is per one pixel as explained previously. In the case of a R column, the charges provided to the horizontal transfer unit 14 includes the signal components (2×G2 or 2×R2) and the noise component per one pixel (S0). In addition to the signal components (2×G2 or 2×R2) and the noise component per one pixel (S0), the charges transferred from the R column also include a noise component (S2). The noise component (S2) has been included in a packet in a prior vertical transfer stage. Why the noise component (S2) is also included in the charges will be explained later. Here, the transfer electrodes in the vertical final stage 21 are provided with transfer pulses at timings during a period A as shown in FIG. 9.

Next, as shown in FIG. 11, after the horizontal transfer unit 14 horizontally transfers the charges for one horizontal transfer stage, by keeping electrode V5L in the vertical transfer stage 21 of a L column as Low, a gate of the electrode V5L is used as a barrier not to transfer a noise component in a packet in the vertical final stage 21 of the L column, to the horizontal transfer unit 14, but the noise component is mixed to a noise component in an empty packet in a subsequent vertical transfer stage. Noise components in other B and R columns are transferred to the horizontal transfer unit 14, and mixed to charges in respective horizontal transfer stages.

Note that charges in these empty packets are noise charges including not only smear components but also dark current components and the like, which are generated in the virtual transfer unit 13.

Here, the transfer electrodes in the vertical final stage 21 are applied with transfer pulses at timings during a period B shown in FIG. 9.

Next, as shown in FIG. 12, after the horizontal transfer unit 14 horizontally transfers again the charges for one horizontal transfer stage, by keeping an electrode V5R in the vertical transfer stage 21 of the R column as Low, a gate of the electrode V5R is used as a barrier not to transfer a noise component in a packet in the vertical final stage 21 of the R column, to the horizontal transfer unit 14, but the noise component is mixed to a noise component in an empty packet in a subsequent vertical transfer stage. Noise components in other B and L columns are transferred to the horizontal transfer unit 14, and mixed to charges in respective horizontal transfer stages. As a result, in the horizontal transfer unit 14, it is possible to separate (i) a horizontal transfer stage having: signal components (2×G2 or 2×R2) and a noise component (S0) in a signal packet; and noise components (S1 and S2) in empty packets, all of which are added and mixed together, from (ii) another horizontal transfer stage having: only signal components (2×G1 or 2×R1) and a noise component in a signal packet.

Here, the transfer electrodes in the vertical final stage 21 are applied with transfer pulses at timings during a period B shown in FIG. 9.

In this situation, the horizontal transfer unit 14 is driven to perform horizontal transfer in order to output signals. In more detail, the transfer processing shown in FIGS. 10 to 12 is performed during one horizontal blanking interval.

By using only charges in the latter horizontal transfer stage (ii) (charges enclosed in a thick line in the horizontal transfer unit 14 of FIG. 12) as final image signals, it is possible to significantly reduce noise components included in the image. Subsequently, the processing shown in FIGS. 10 to 12 is repeated to output image signals.

Note that the first embodiment has described the reading and transferring processing for (G-R) rows, but the (G-B) rows are also applied with the same reading and transferring processing.

As described above, according to the first embodiment, the transfer electrodes in the vertical final stage 21 are able to be driven without depending on electrodes in other vertical transfer stages, so that vertical transfer processing differs from each column. Furthermore, the vertical transfer processing is combined with horizontal transfer processing of the horizontal transfer unit 14, so that signal components can be separated from noise components. As a result, in the pixel thinning readout driving in vertical and horizontal directions, it is possible to minimize noise components in charges used for image signals. As a result, in the preview mode, pixels can be thinned also in a horizontal direction, which makes it possible to realize high-speed image readout, in other words, realize high frame rate, thereby achieving high-quality images. Moreover, by blocking transfer of a noise component to a signal packet in the vertical final stage 21 as shown in FIG. 12, it is possible to prevent from increasing steps of transferring the noise component from an empty packet, thereby preventing from reduction of a frame rate.

Note that the first embodiment has described the thinning readout driving in which charges of two pixels are added and mixed together in the vertical transfer unit 13. However, if resolution in a vertical direction is to be improved, it is also conceived not to perform such pixel-data adding in the vertical transfer unit 13 as shown in FIG. 8B. In this case, although noise components in image signals are increased as compared to FIGS. 10 to 12, it is possible to significantly reduce noise components more than the conventional methods as described later.

Figures 13A, 13B, 13C:
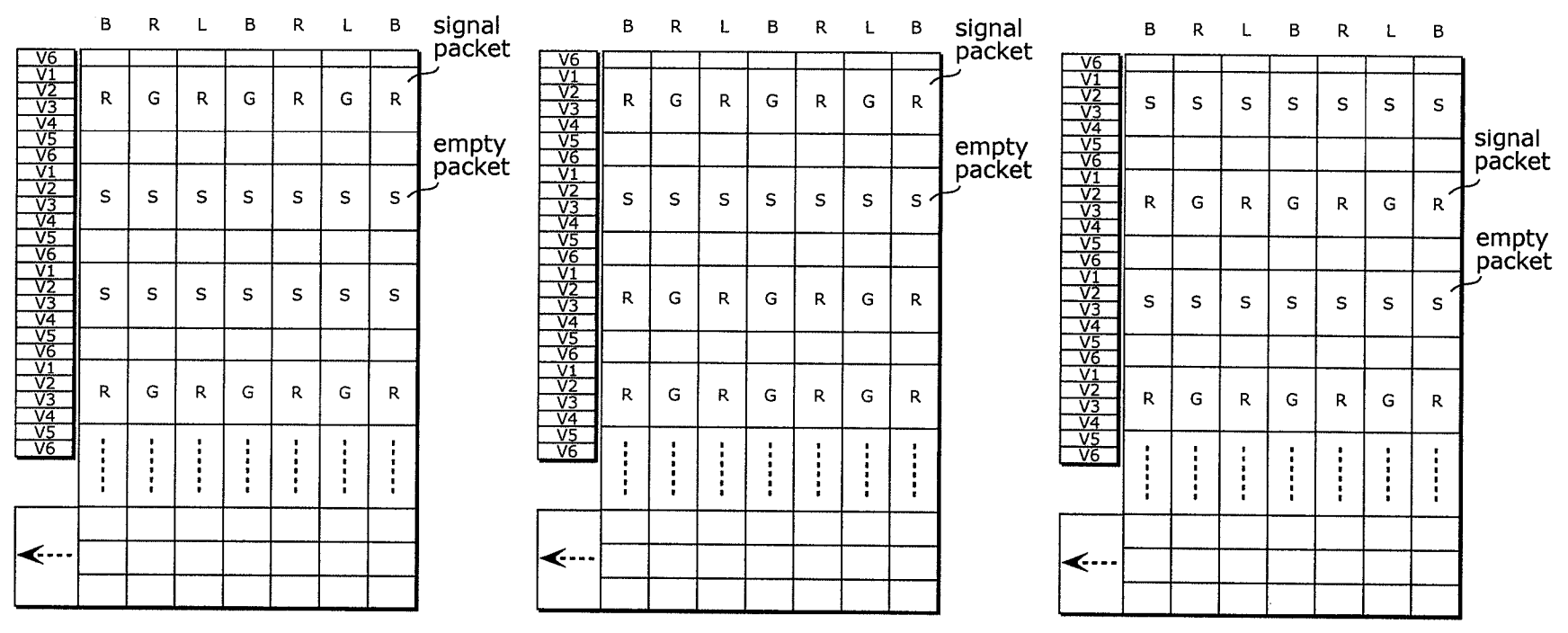
Figure 14:
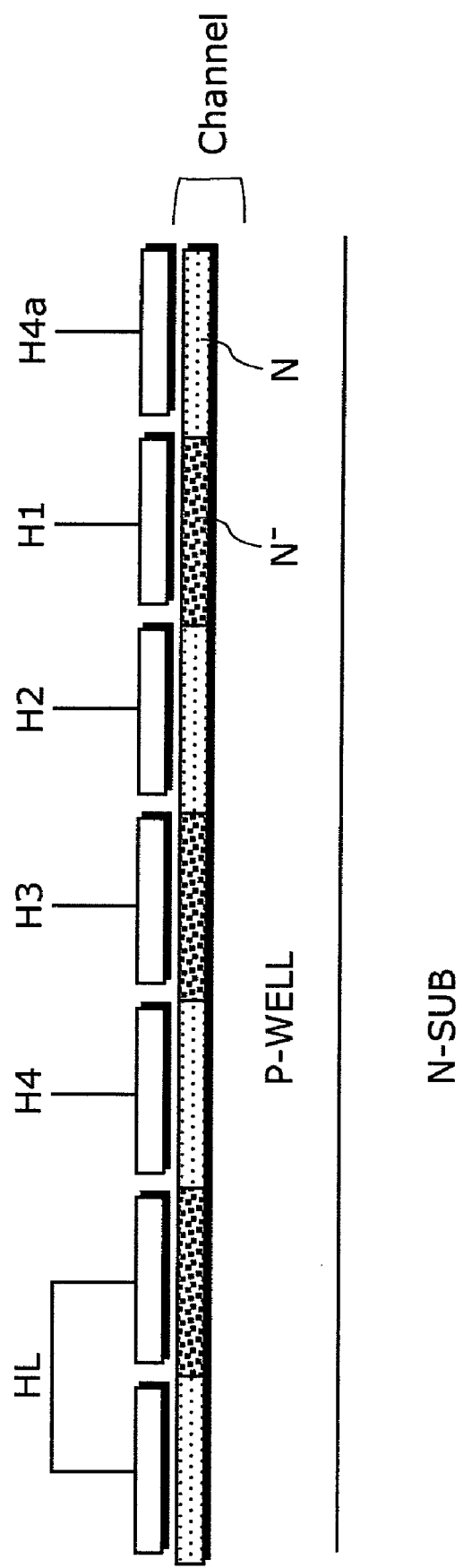
FIG. 14 is a schematic diagram showing a horizontal transfer unit by which driving becomes possible in the packet arrangement of FIG. 13C.

However, in this case, as shown in FIGS. 13A and 13B, it is necessary to transfer charges in the situation where signal packets are continuous. In the case where signal packets and empty packets exist alternately as shown in FIG. 13C, if only signal packets are to be added together, it is necessary to also add a noise packet between the signal packets. However, if the horizontal transfer unit 14 is not driven by two phases, for example if the horizontal transfer unit 14 is driven by four phases as shown in FIG. 14, by blocking transfer of charges within the horizontal transfer unit 14, it is possible to separate signal components from noise components even in the packet sequence shown in FIG. 13C.

Figure 15:
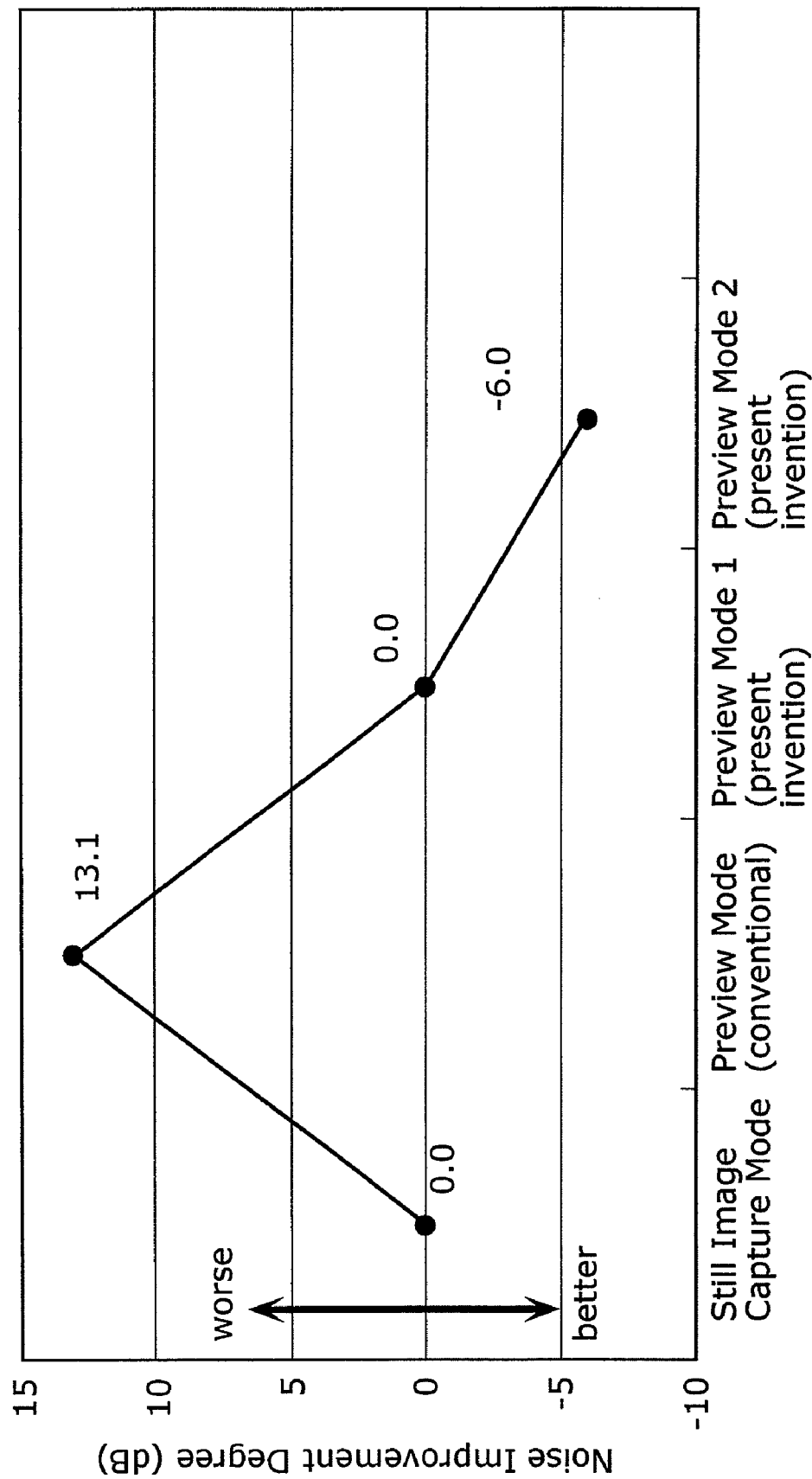
FIG. 15 is a graph showing noise improvement degrees in various preview modes regarding signals obtained in still image capture mode, according to the first embodiment of the present invention.
Figure 16:
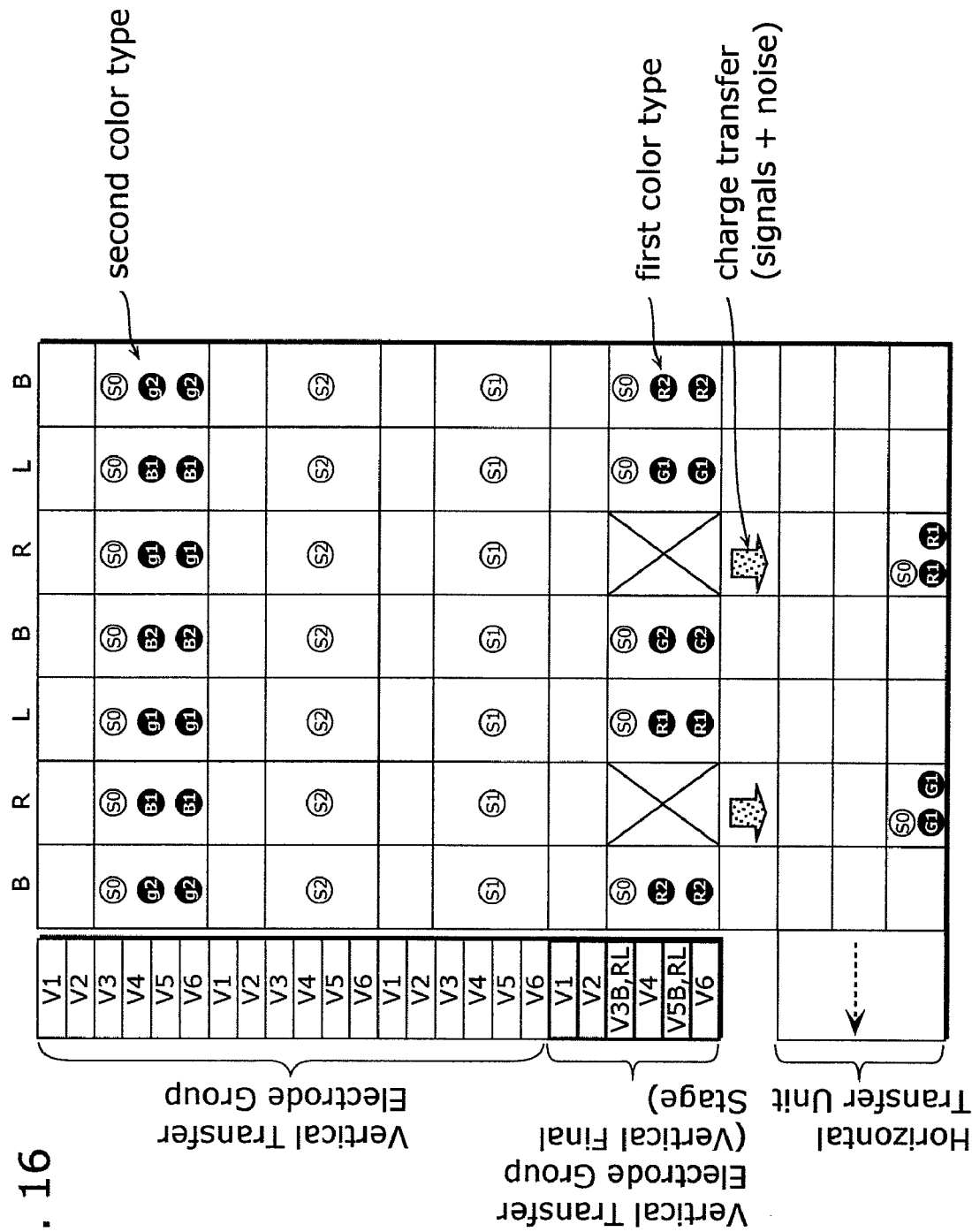
FIG. 16 is a diagram showing how charges are transferred in a transfer unit in a solid-state imaging device according to the second embodiment of the present invention.

FIG. 15 shows noise improvement degrees in various thinning readout driving (preview modes) regarding signals obtained in all-pixel readout driving (still image capture mode).

In the still image capture mode, charges from one pixel include one signal component and one noise component. On the other hand, in the case where charges are read out from two pixels among nine pixels in a vertical direction, in the conventional preview mode, noise components of nine pixels are added to signal components of two pixels, so that the noise improvement degree becomes worse to $20 \times \log(9/2) \approx 13.1$ (dB). On the other hands, in the first embodiment, if pixel-data (charges) are not added together in the vertical transfer unit 13 as shown in FIG. 8B, noise components of two pixels are added to signal components of two pixels, so that a ratio of noise components to signal components is the same as the ratio regarding the still image capture mode, in other words, the noise improvement degree becomes 0 (dB). Furthermore, in the thinning readout driving in which charges of two pixels are added and mixed together using the above-described processing of FIGS. 10 to 12, a noise component of one pixel is added to signal components of two pixels, so that the noise improvement degree becomes $20 \times \log(1/2) \approx -6.0$ (dB), in other words, the noise improvement degree is improved by 6 (dB) compared to the still image capture mode.

Note also that, noise components are incorporated into charges transferred in the vertical transfer unit 13, so that the horizontal thinning readout driving does not influence the noise improvement.

As obvious from the above description, with comparison to outputs in the conventional preview mode, the first embodiment can significantly increase the noise improvement degrees to about 13 (dB) without vertical pixel-data adding, and to 19 (dB) with vertical pixel-data adding.

The noise improvement degree varies depending on a rate of thinning. It is obvious that the higher the rate is, the better the noise improvement degree becomes.

Note also that, in FIGS. 10 to 14, for the sake of simplified explanation, each vertical transfer stage of the horizontal transfer unit 14 is shown to be divided into a plurality of segments, but in reality, the horizontal transfer stage is not divided into such segments, and does not have the double-density packet structure as disclosed in Patent Reference 3. However, it is necessary to set a capacity of each horizontal transfer stage enough to hold charges.

Note also that, in the first and following embodiment, signal components which are eventually used as image signals, are assigned with symbols with 1 (G1, R1, for example), and signal components which are not used as image signals, are assigned with symbols with 2 (G2, R2, for example). Note also that each noise component (S0, S1, or S2) is a component per one pixel, and charges of each component are assumed to be equal.

Second Embodiment

The following describes a solid-state imaging device and a driving method of the device, according to the second embodiment of the present invention. The structure of the solid-state imaging device of the second embodiment is the same as the previously-described structure shown in FIGS. 6, 7A, 7B, and 8A.

FIGS. 16 to 21 are diagrams showing how charges are transferred in the vertical transfer unit 13 and the horizontal transfer unit 14 according to the second embodiment of the present invention. The processing of the second embodiment differs form the processing of the first embodiment mainly in that signal components of the same color are mixed together in the horizontal transfer unit 14. By such processing, it is possible to increase color signal components in image signals, thereby improving color sensitivity and efficiently using pixels.

The following describes how to transfer charges. In order to distinguish G components in (G-R) rows (hereinafter, referred to as a first color type) from G components in (G-B) rows (hereinafter, referred to as second color type), the G components in the second color type are assigned with reference numerals such as g1 and g2.

Among signal components of the first color type accumulated in the vertical final stage 21, only signal components of signal packets in a R column are provided to the horizontal transfer unit 14.

Figure 17:
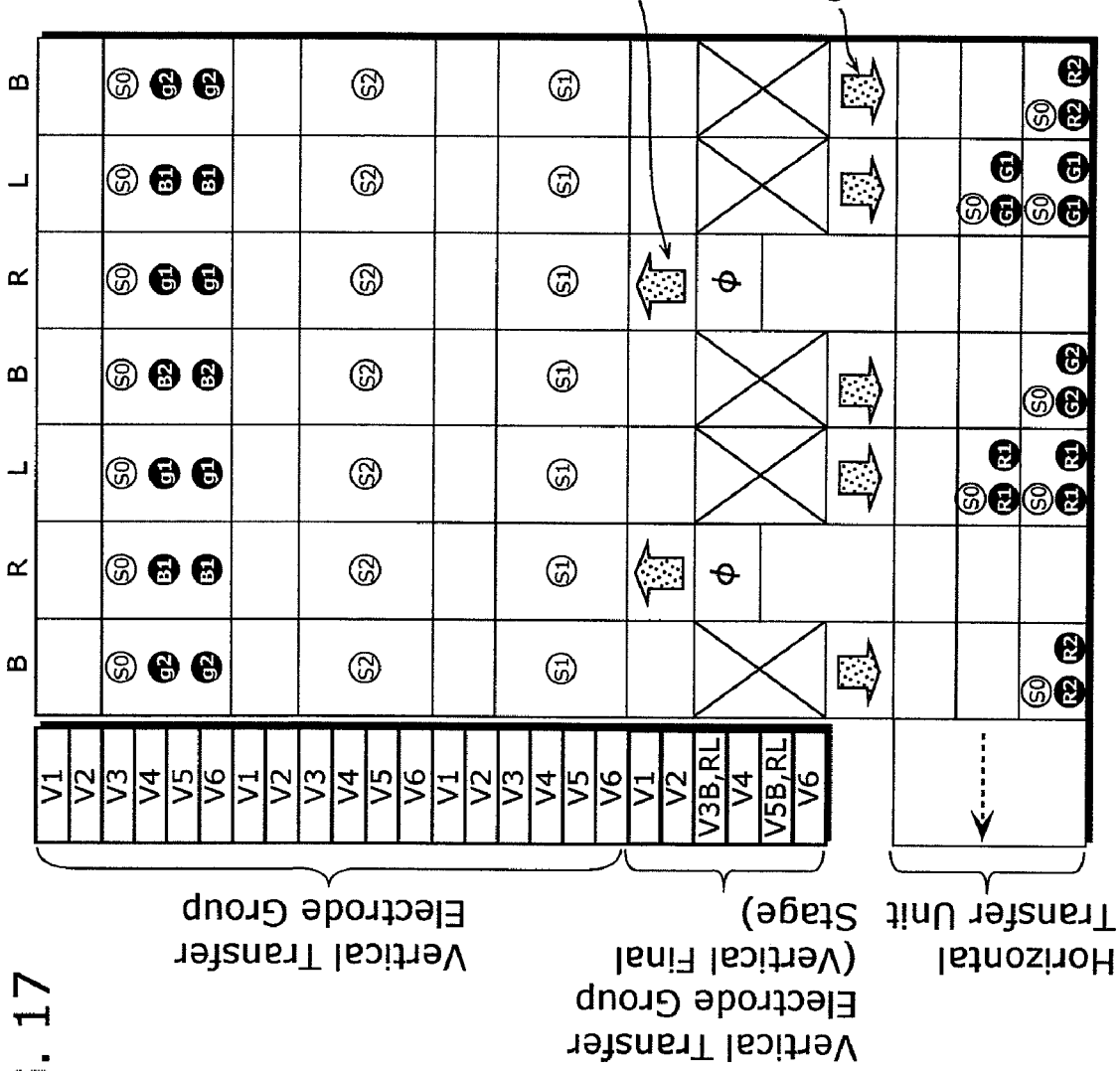
FIG. 17 is a diagram showing how charges are transferred in vertical and horizontal transfer units in the solid-state imaging device according to the second embodiment of the present invention.

After two-stage transfer by the horizontal transfer unit 14, then only charges in signal packets in B and L columns are provided to the horizontal transfer unit 14 as shown in FIG. 17. By this transfer processing, charges including G1 components are added and mixed together, and charges including R1 components are added mixed together. Here, as shown in FIG. 17, empty packets in a R column (without any noise components) may be added to a packet in a subsequent vertical transfer stage.

Figure 18:
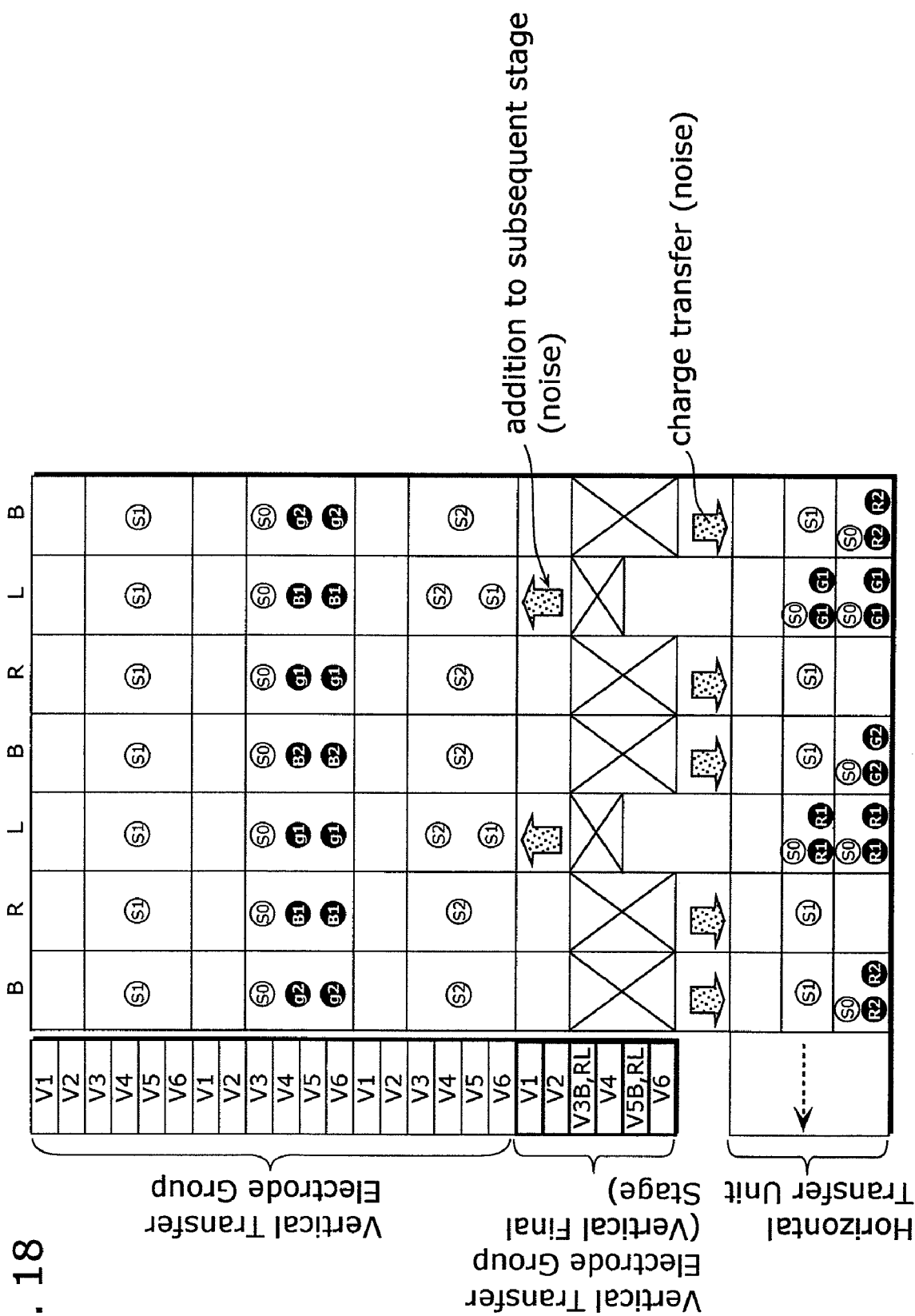
FIG. 18 is a diagram showing how charges are transferred in the vertical and horizontal transfer units in the solid-state imaging device according to the second embodiment of the present invention.

By the above vertical transfer processing, the empty packets are transferred to the vertical final stage 21. Among them, charges of only noise components in empty packets in B and R columns are provided to the horizontal transfer unit 14 as shown in FIG. 18. By blocking noise components transferred from L column, no noise components are added from empty packets to charges including G1 components and charges including R1 components. Furthermore, noise components of an empty packet in L column are added to an empty packet in a subsequent vertical transfer stage.

Figure 19:
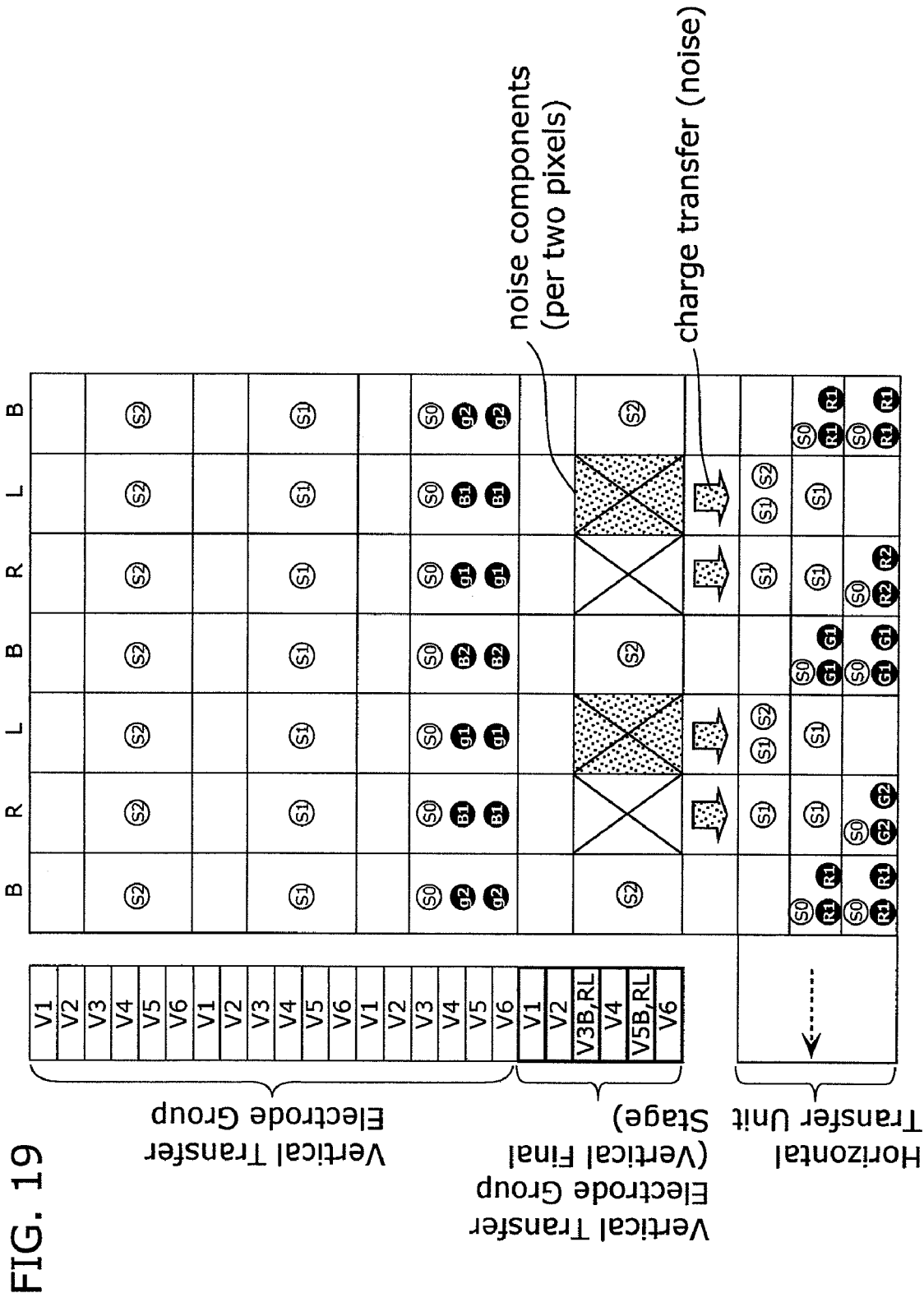
FIG. 19 is a diagram showing how charges are transferred in the vertical and horizontal transfer units in the solid-state imaging device according to the second embodiment of the present invention.

Next, after two-stage transfer by the horizontal transfer unit 14, among the empty packets in the vertical final stage 21, from empty packets in L and R columns, charges of only noise components are provided to the horizontal transfer unit 14 as shown in FIG. 19.

Since, at start of transfer of noise components, charges including G1 components or charges including R1 components are located in a B column, no noise components are added from empty packets to a horizontal transfer stage corresponding to the B column.

Figure 20:
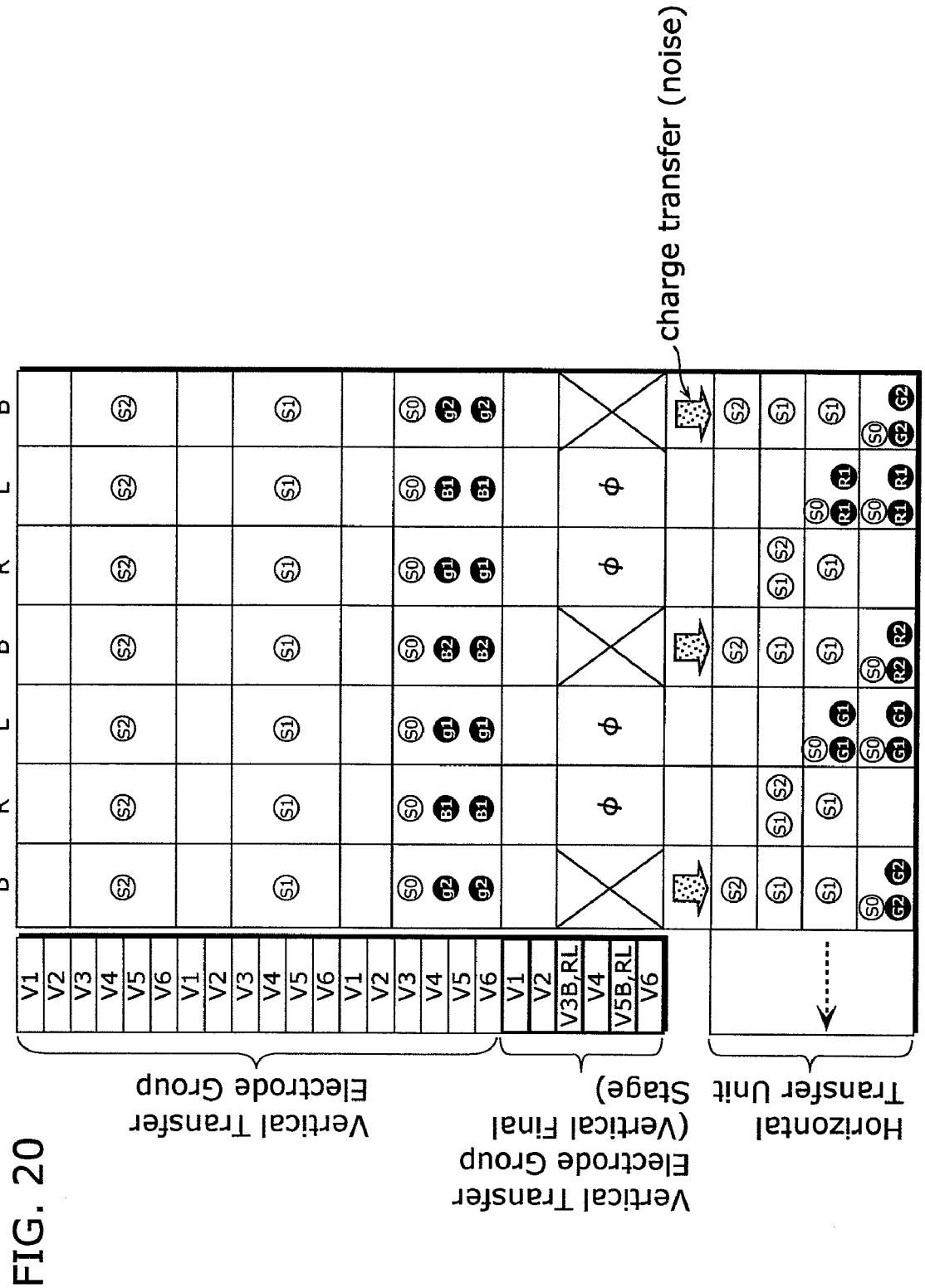
FIG. 20 is a diagram showing how charges are transferred in the vertical and horizontal transfer units in the solid-state imaging device according to the second embodiment of the present invention.

After one-stage transfer by the horizontal transfer unit 14, among the empty packets in the vertical final stage 21, from empty packets in B column, charges of only noise components are provided to the horizontal transfer unit 14 as shown in FIG. 20.

Since, at start of transfer of noise components, charges including G1 components or charges including R1 components are located in a L column, no noise components are added from empty packets to a horizontal transfer stage corresponding to the L column.

Figure 21:
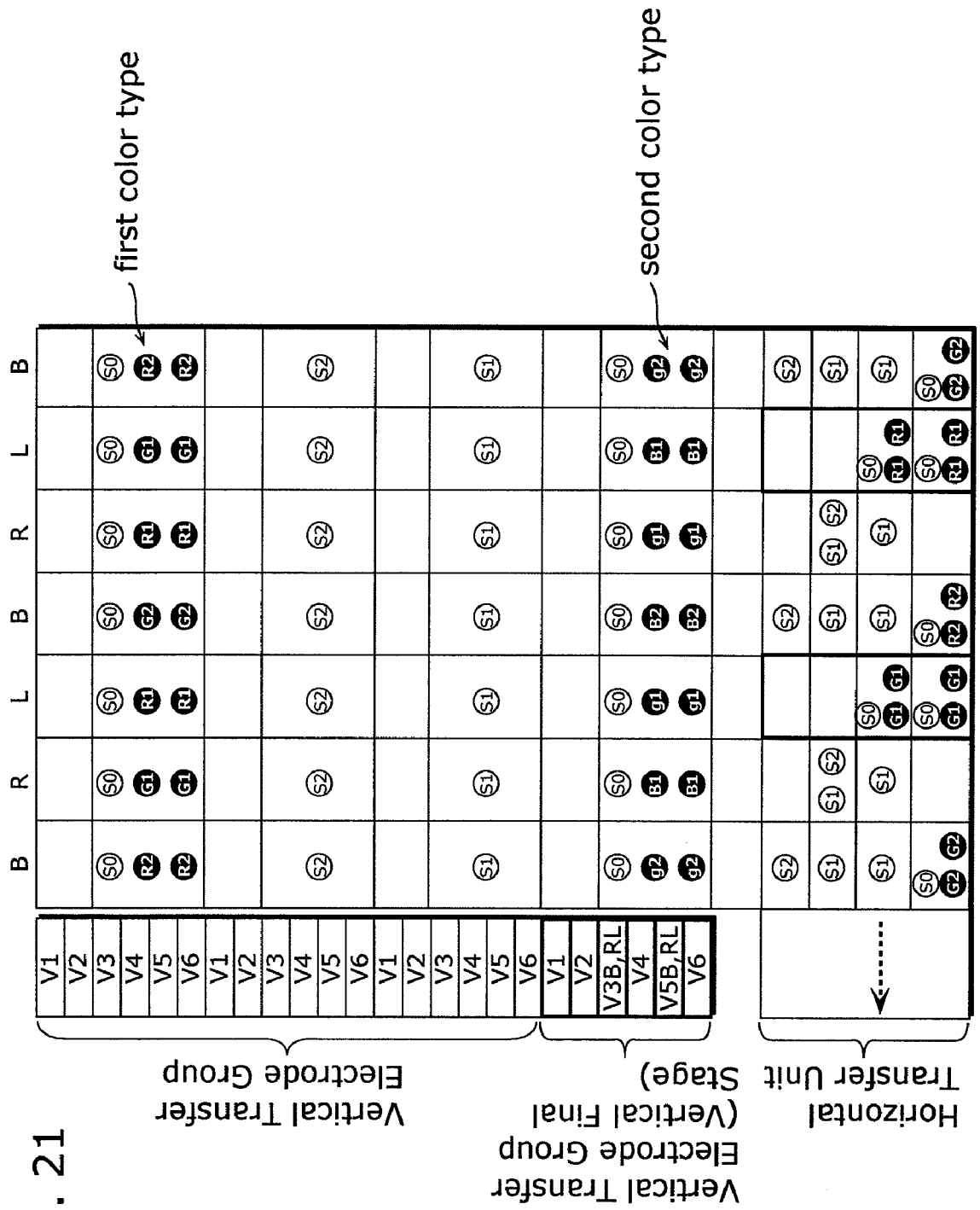
FIG. 21 is a diagram showing how charges are transferred in the vertical and horizontal transfer units in the solid-state imaging device according to the second embodiment of the present invention.

By the above vertical transfer processing, signal packets in second color type are transferred to the vertical final stage 21 as shown in FIG. 21.

Here, a situation where no noise components are added from empty packets into charges including G1 components and charges including R1 components is realized in the horizontal transfer unit 14. In other words, it is possible to clearly separate signal components and noise components.

Note that, in each of a vertical transfer stage having charges including G1 components and a vertical transfer stage having charges including R1 components, signal components of four pixels are included. By vertically transfer the signal components to be outputted, it is possible to obtain double output per one packet, compare d to the first embodiment.

In this situation, the horizontal transfer unit 14 is driven to perform horizontal transfer processing, thereby outputting signals. In other words, the transfer processing shown in FIGS. 16 to 21 is performed during one horizontal blanking interval.

Subsequently, the above processing is repeated to obtain image signals.

Third Embodiment

The following describes a solid-state imaging device and a driving method of the device, according to the third embodiment of the present invention. The structure of the solid-state imaging device of the third embodiment is the same as the previously-described structure shown in FIGS. 6, 7A, 7B, and 8A.

FIGS. 22 to 30 are diagrams showing how charges are transferred in the vertical transfer unit 13 and the horizontal transfer unit 14 according to the third embodiment of the present invention. The processing of the third embodiment differs form the processing of the second embodiment mainly in that horizontal transfer processing is performed in the situation where charges of signal components in both first color type and second color type exist in the horizontal transfer unit 14. By such processing, it is possible to increase color signal components in image signals, thereby improving color sensitivity and efficiently using pixels. Furthermore, it is also possible to increase types of signals which are able to be transferred during one horizontal blanking interval, thereby realizing high-speed image reading.

The following describes how to transfer charges.

Among signal charges of first color type accumulated in the vertical final stage 21, only signal charges of signal packets in a R column are provided to the horizontal transfer unit 14.

Figure 23:
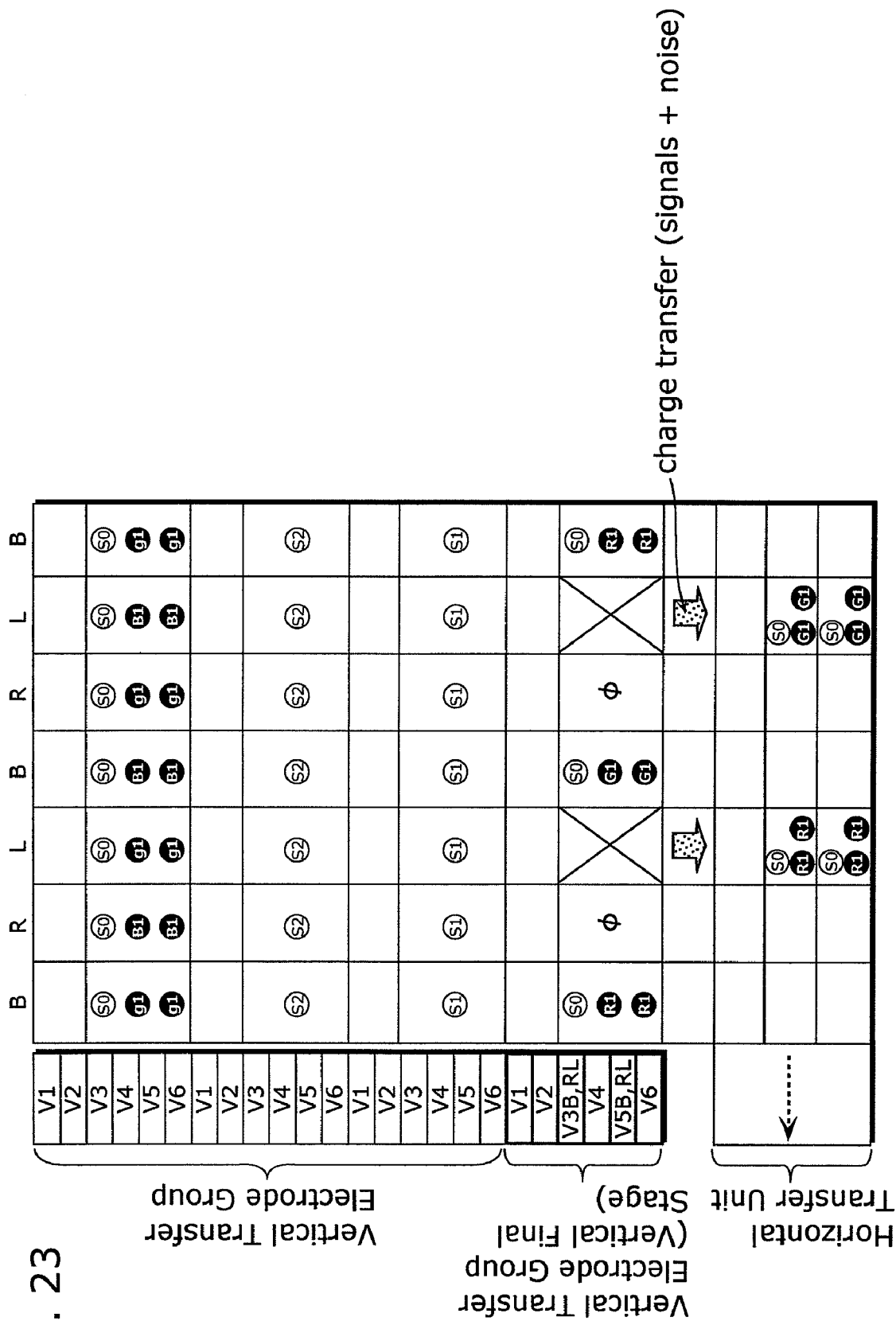
FIG. 23 is a diagram showing how charges are transferred in the vertical and horizontal transfer units in the solid-state imaging device according to the third embodiment of the present invention.

After two-stage transfer by the horizontal transfer unit 14, then only charges in signal packets in B and L columns are provided to the horizontal transfer unit 14 as shown in FIG. 23. By this transfer processing, charges including G1 components are added and mixed together, and charges including R1 components are added and mixed together.

Figure 24:
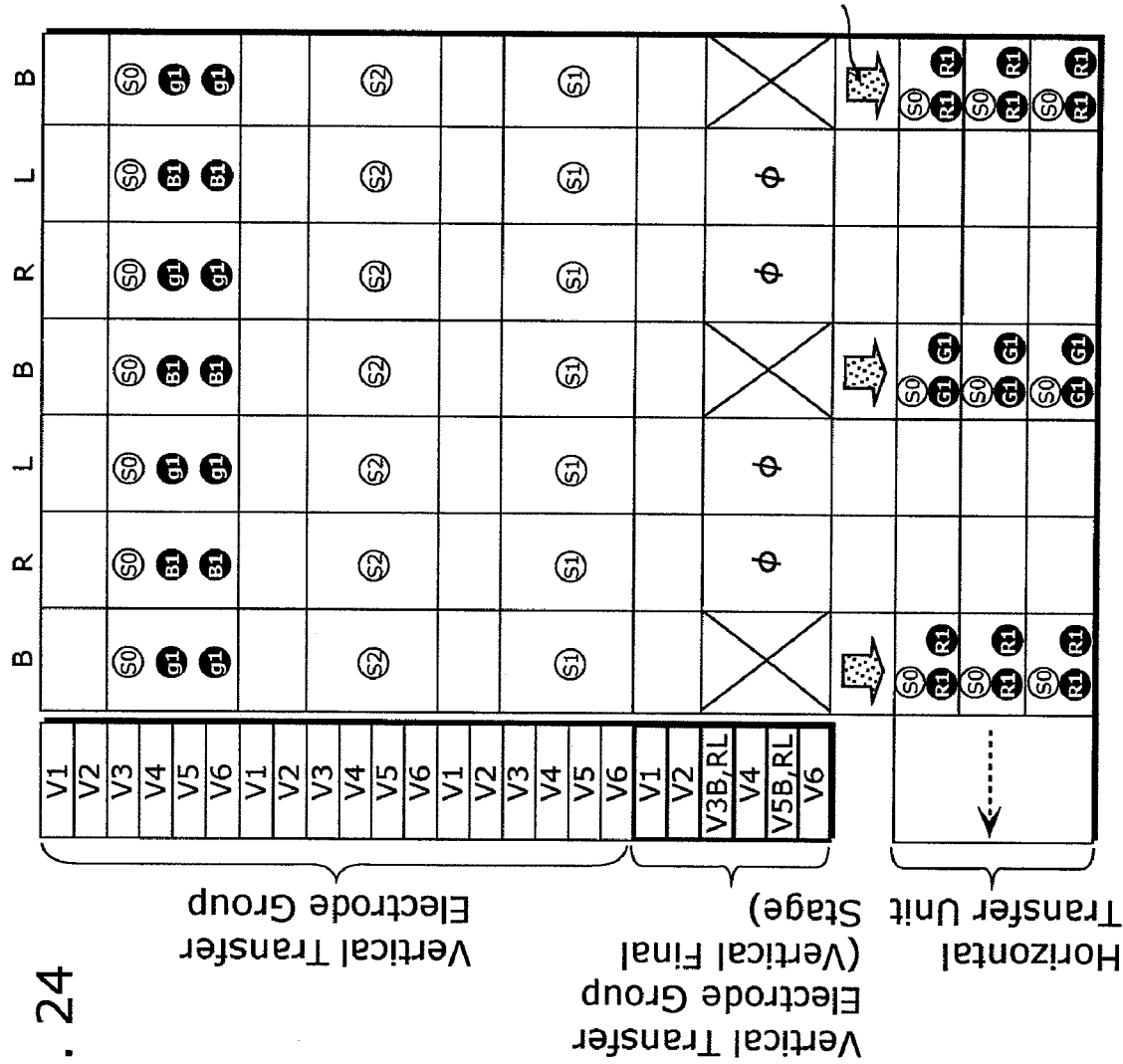
FIG. 24 is a diagram showing how charges are transferred in the vertical and horizontal transfer units in the solid-state imaging device according to the third embodiment of the present invention.

Likewise, after further two-stage transfer by the horizontal transfer unit 14, then only charges in signal packets in B column are provided to the horizontal transfer unit 14 as shown in FIG. 24. By the transfer processing, charges including G1 components for six pixels are added and mixed together, and charges including R1 components for six pixels are added and mixed together.

Figure 25:
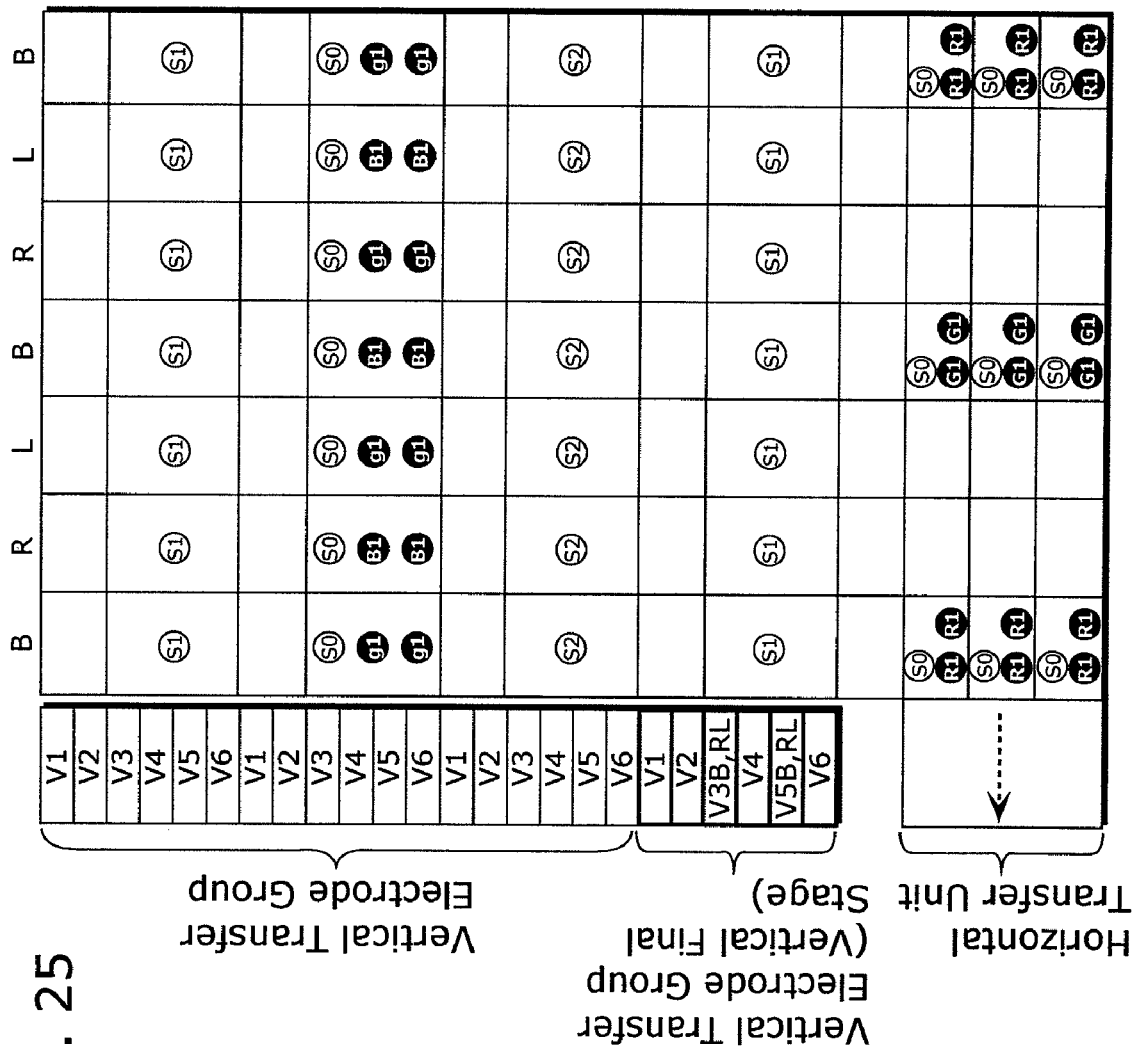
FIG. 25 is a diagram showing how charges are transferred in the vertical and horizontal transfer units in the solid-state imaging device according to the third embodiment of the present invention.

By the above-described vertical transfer processing, empty packets are transferred to the vertical final stage 21 as shown in FIG. 25.

Figure 22:
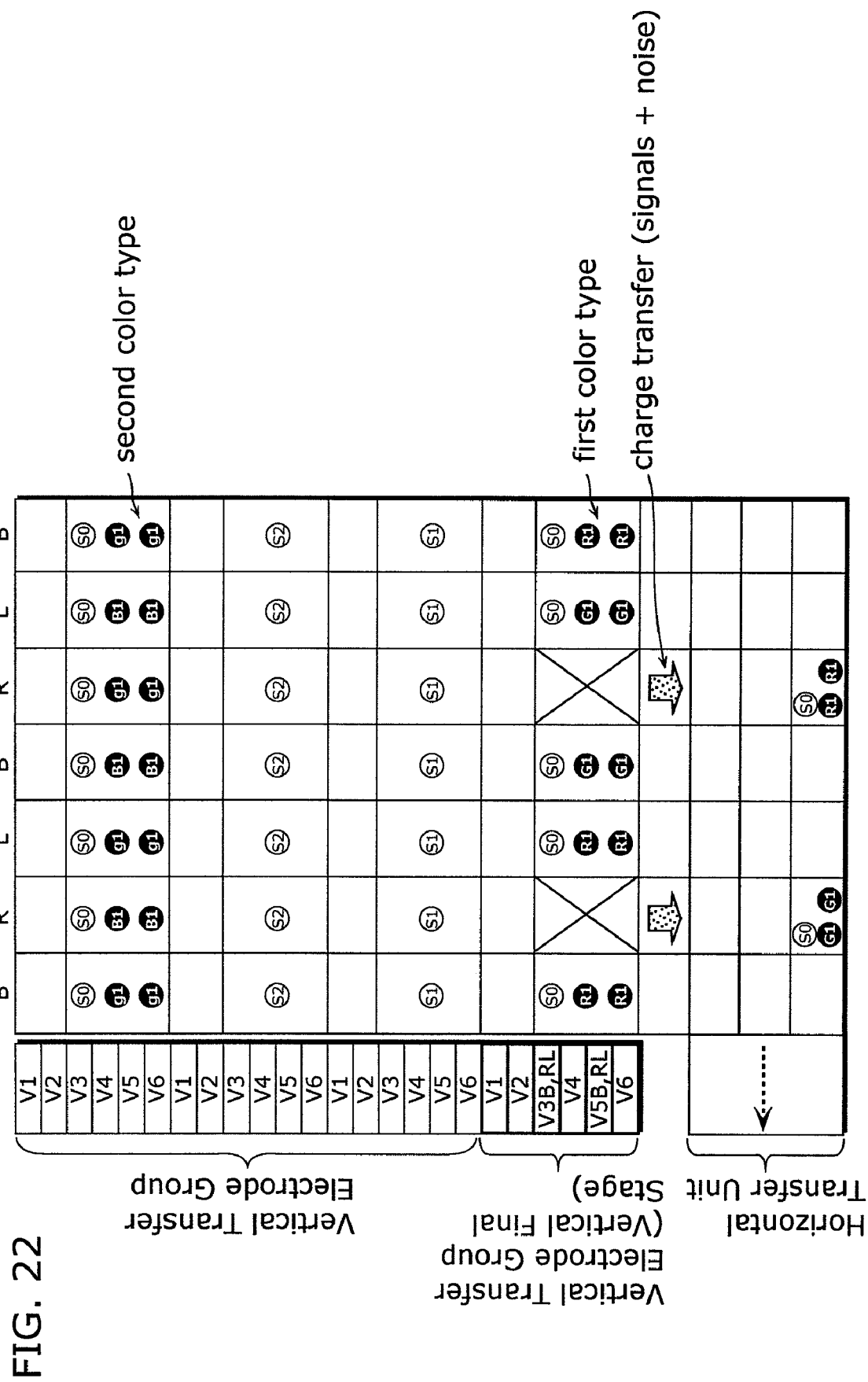
FIG. 22 is a diagram showing how charges are transferred in vertical and horizontal transfer units in a solid-state imaging device according to the third embodiment of the present invention.
Figure 26:
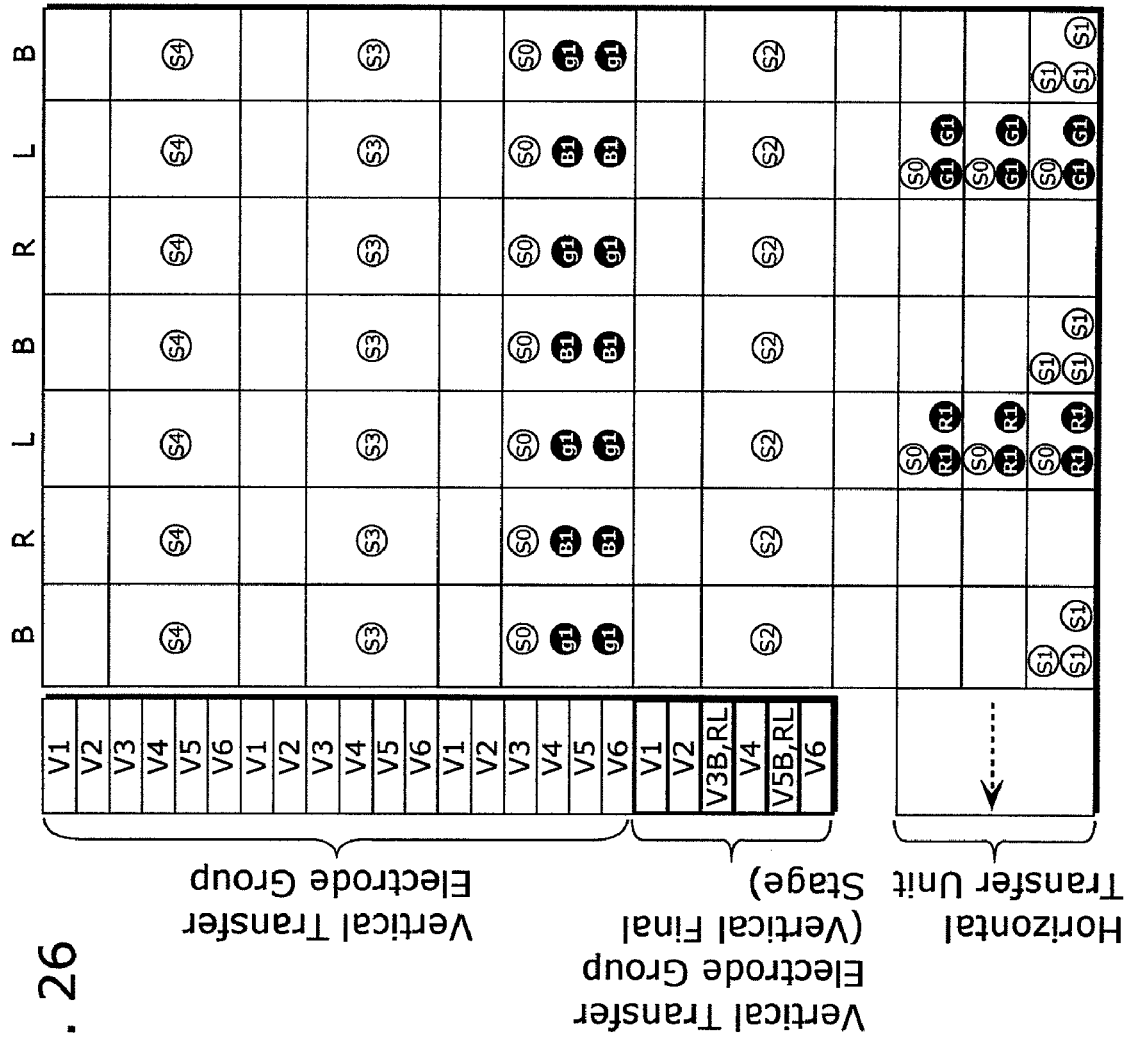
FIG. 26 is a diagram showing how charges are transferred in the vertical and horizontal transfer units in the solid-state imaging device according to the third embodiment of the present invention.
Figure 27:
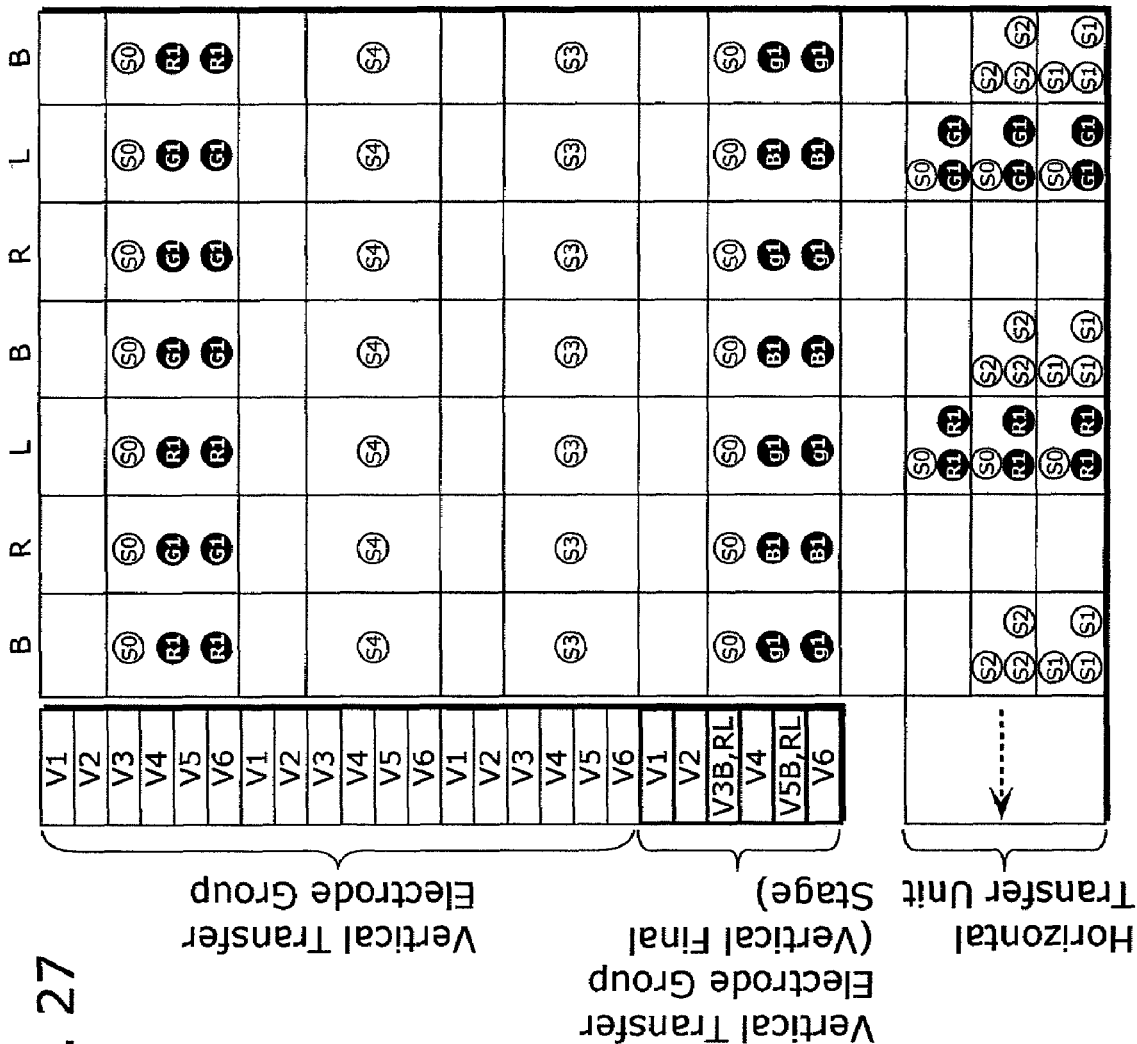
FIG. 27 is a diagram showing how charges are transferred in the vertical and horizontal transfer units in the solid-state imaging device according to the third embodiment of the present invention.
Figure 28:
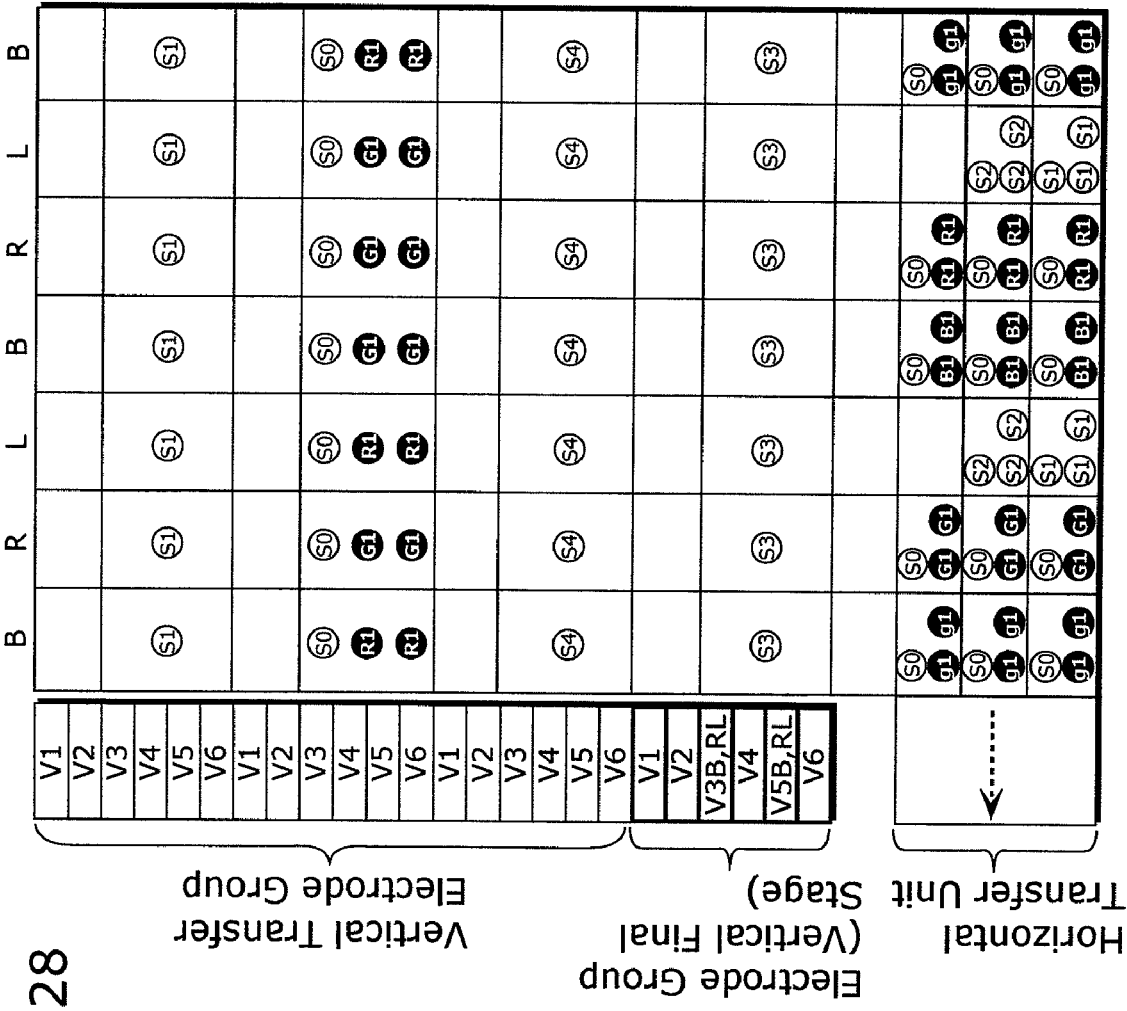
FIG. 28 is a diagram showing how charges are transferred in the vertical and horizontal transfer units in the solid-state imaging device according to the third embodiment of the present invention.

As shown in FIG. 26, noise components in the empty packets are transferred to the horizontal transfer unit 14 by the processing of FIGS. 22 to 24. At the completion of transfer from the vertical final stage 21, noise components per three pixels are added and mixed together, and collected in one horizontal transfer stage of the horizontal transfer unit 14. In the example of FIG. 26, charges of noise components (S1) are collected under B columns, and charges of signal components and noise components are collected under L columns, respectively and separately.

Further, the above processing is repeated to transfer charges from the vertical final stage 21 to the horizontal transfer unit 14, separating signal components from noise components. By the above vertical transfer processing, signal packets in second color type are transferred to the vertical final stage 21.

Next, by performing the processing of FIGS. 22 to 24, charges in second color type are transferred to the horizontal transfer unit 14, in a situation where signal components and noise components of the first color type are separated.

Figure 29:
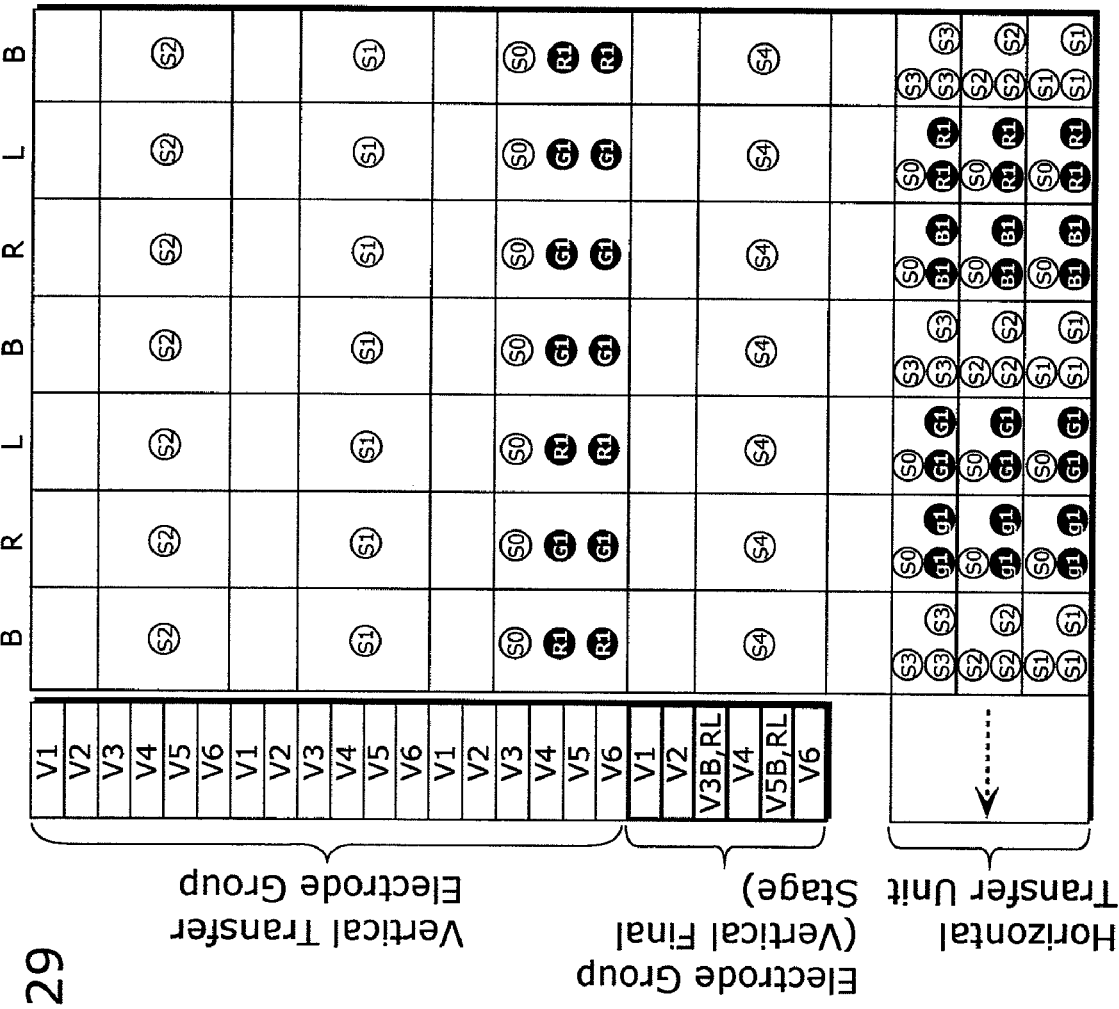
FIG. 29 is a diagram showing how charges are transferred in the vertical and horizontal transfer units in the solid-state imaging device according to the third embodiment of the present invention.

Furthermore, noise components (S3, S4) separated from signal components are transferred to the horizontal transfer unit 14 as shown in FIG. 29.

Figure 30:
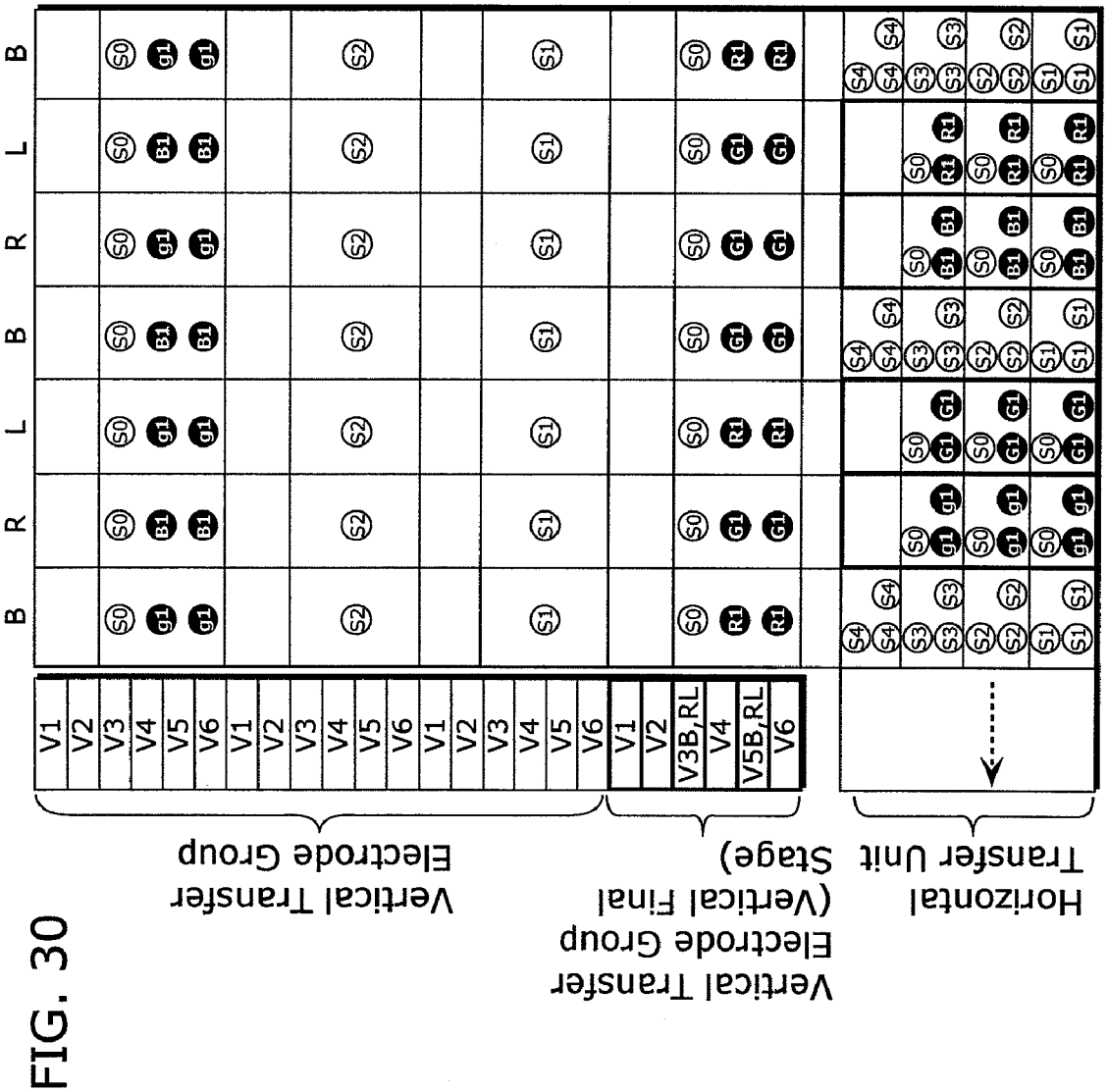
FIG. 30 is a diagram showing how charges are transferred in the vertical and horizontal transfer units in the solid-state imaging device according to the third embodiment of the present invention.

By the above vertical transfer processing, signal packets in first color type are transferred to the vertical final stage 21 as shown in FIG. 30.

Here, a situation where no noise components are added from empty packets into charges including G1 components, R1 components, g1 components, and B1 components is realized in the horizontal transfer unit 14. In other words, it is possible to clearly separate signal components and noise components.

Furthermore, the third embodiment has three independent vertical transfer stages repeated in a horizontal direction, and it is possible to separate signal components from noise components by allocating, in the horizontal transfer unit 14, the signal components to two packets and the noise components to one packet. More specifically, when the vertical final stage 21 has the same transfer electrode structure in every m (m is integer number equal to or more than 2) rows, and the electrode structure is repeated every m rows in a horizontal direction, while in the conventional technologies signal packets and empty packets including only noise components are mixed to be outputted, it is possible in the third embodiment to realize signal output with significant reduction of noise components, by allocating (i) signal packets in (m−1) columns to a certain horizontal transfer stage of the horizontal transfer stage 14 and (ii) empty packets in one column among m columns to a different horizontal transfer stage (in the third embodiment, signal packets in a certain horizontal transfer stage in the horizontal transfer unit 14 are given from two rows among m columns, and noise packets in a different horizontal transfer stage are given from one row among m columns, where m=3).

Note that, in each of a vertical transfer stage having charges including G1 components and a vertical transfer stage having charges including R1 components, signal components of four pixels are included. By vertically transfer the signal components to be outputted, it is possible to obtain triple output per one packet, compare d to the first embodiment.

In this situation, the horizontal transfer unit 14 is driven to perform horizontal transfer processing, thereby outputting signals. In more detail, the transfer processing of FIGS. 22 to 30 is performed during one horizontal blanking interval, and an amount of data transferred to the electronic charge detection unit 15 by one horizontal transfer processing becomes double, compared to the second embodiment. Thereby, it is possible to speed up reading out of image signals.

Subsequently, the above processing is repeated to obtain image signals.

Furthermore, in the same method as described in the third embodiment, it is possible to realize high-speed readout and high-quality image in a preview mode in multiple-pixel mixing driving.

For example, as shown in FIG. 31A, total 9 pixels of three pixels in every other pixel in a horizontal direction, by three pixels in every other row in a vertical direction, are assumed to be a group of mixed pixels. Under the assumption, when the above-described transfer processing is performed, noise components can be reduced, and signal components from all photodiodes can be mixed without be discarded, so that sensitivity is improved and the device and method is more preferable than the first to third embodiments. In this case, a center of the mixed pixel group of each RGB is located evenly spaced apart from other centers as shown in FIG. 31A. Therefore, it is possible to obtain images having high-resolution and less moire.

Furthermore, as shown in FIG. 31B, it is also possible to set, as a mixed pixel group, total 6 pixels obtained by thinning pixels in the vertically middle rows from the nine pixels of FIG. 31A. In this case also, a center of the mixed pixel group of each RGB is located evenly spaced apart from other centers, so that it is possible to obtain images having high-resolution and less moire.

Fourth Embodiment

Figure 32:
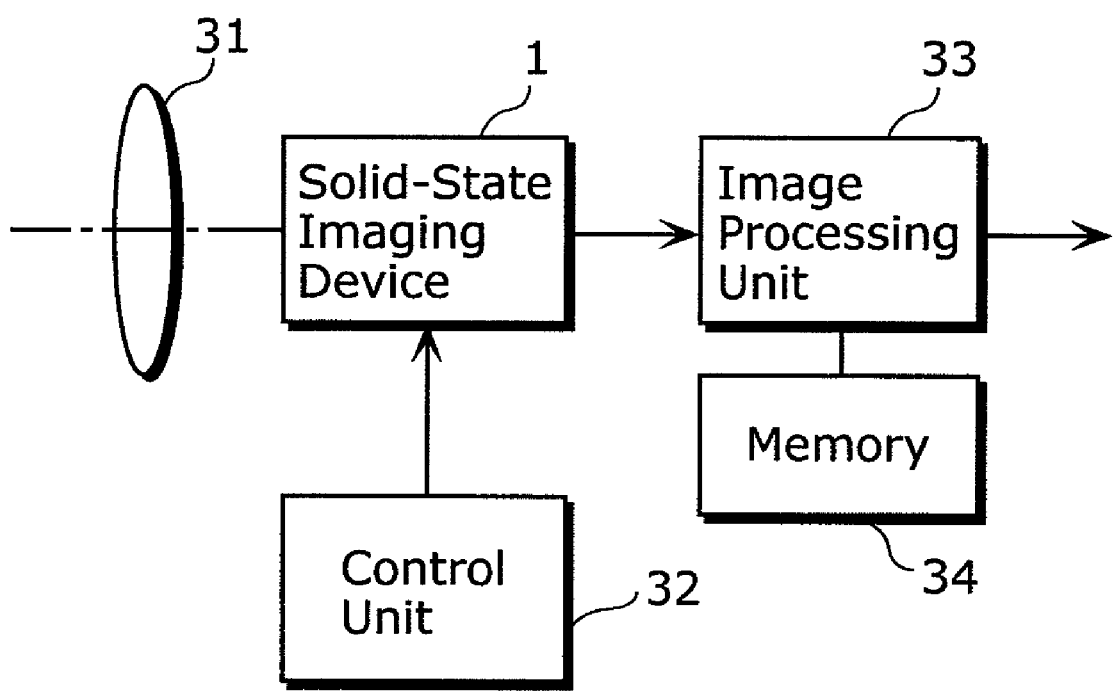
FIG. 32 is a schematic diagram showing a structure of a digital camera according to the fourth embodiment of the present invention.

The following describes a digital camera according to the fourth embodiment of the present invention. FIG. 32 is a schematic diagram showing a structure of the digital camera according to the fourth embodiment of the present invention. The digital camera of the fourth embodiment has an optical system 31, a control unit 32, and an image processing unit 33. The optical system 31 includes a lens by which incident light from an object is focused on the imaging area of a solid-state imaging device 1. The control unit 32 controls driving of the solid-state imaging device 1. The image processing unit 33 performs various signal processing for output signals from the solid-state imaging device 1.

The solid-state imaging device 1 has a structure shown in FIG. 6 and can perform charge transfer processing described in the first to third embodiments. Furthermore, the control 32 transmits control signals to the timing generation circuit 20 in the solid-state imaging device 1.

According to the digital camera, it is possible to capture high-quality image by significantly reducing influence of noises when image is captured in a preview mode. Furthermore, using signal processing functions of the image processing unit 33, it is possible to obtain an effect of noise reduction more than the case shown in FIG. 15.

Figure 33:
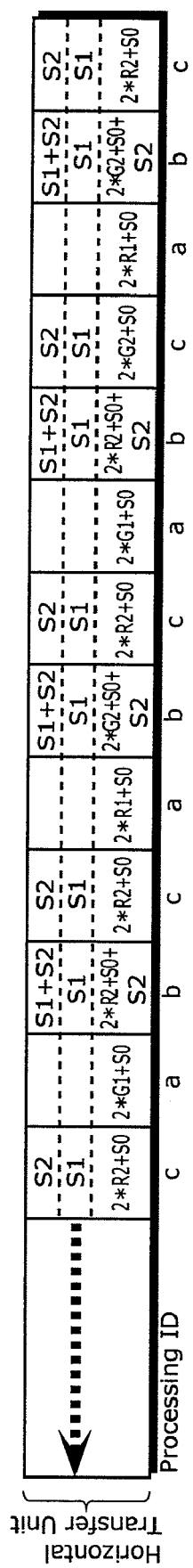
FIG. 33 is a time-sequence diagram of output signals of the solid-state imaging device according to the fourth embodiment of the present invention.
Figure 34:
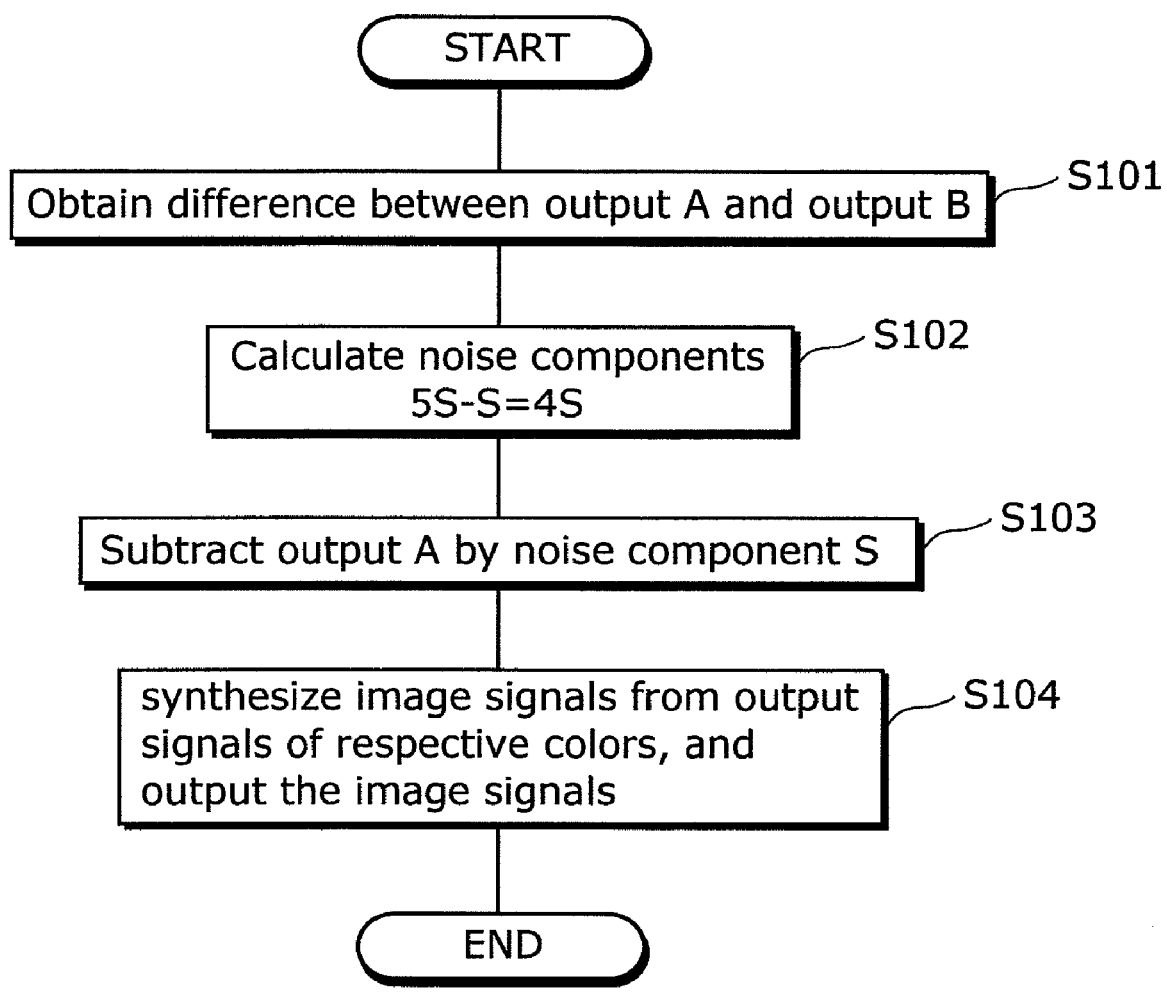
FIG. 34 is a flowchart of one example of signal processing for noise reduction according to the fourth embodiment of the present invention.

FIG. 33 is a time-sequence diagram of output signals of the solid-state imaging device 1, and FIG. 34 is a flowchart of one example of signal processing for noise reduction.

FIG. 33 shows an example of the output processing described in the first embodiment. In FIG. 33, charges used as image signals are outputted from every three vertical transfer stages in a horizontal direction. This three vertical transfer stages is set to one cycle, and each signal is assigned with a processing ID. For example, an output to be used as image signals is assigned with a processing ID A.

Firstly, at Step S101 of FIG. 34, the image processing unit 33 obtains difference between an output A and an output B. Here, the output A has signal components of two pixels and noise components of one pixel (S), and the output B has signal components of two pixels and noise components of five pixels (5S). Therefore, at Step S102, the difference is calculated as noise components of four pixels (4S), by subtracting 5S from S.

Then, the resulting difference is multiplies by ¼, thereby obtaining noise components of about one pixel.

Then, at Step S103, the obtained noise components are subtracted from the output A, thereby obtaining the output almost without noise components. Finally, at Step S104, using such outputs of respective colors are synthesized and outputted as image signals. Here, the image signals obtained from the outputs A, B, C, are deviated with each one pixel, but this does not affect the image visually in a preview mode, since the image is continuously outputted in the preview mode.

Here, the above processing needs a memory 34 in which data as shown in FIG. 32 is stored.

Note that, in the first to third embodiment, six phases, in other words, six vertical transfer electrodes are one group, but the number of the phases is not limited to the above. Note also that the vertical final stage 21 has more electrodes which can be driven independently. For example, respective first-phases in the electrode groups may be independent electrodes V1B, V1R, and V1L.

Note also that the method of thinning pixel data in vertical and horizontal directions can be modified within a scope of the present invention. The number of pixel whose data is mixed in the multiple-pixel mixing driving may be not 6 pixels or 9-pixel data, but also 4 pixels or more than 9 pixels.

Note also that the timing generation circuit 20 may be arranged inside or outside the solid-state imaging device 1. Note also that the signal processing method for noise reduction is not limited to the method described in the fourth embodiment, but the method may be any other methods.

Note also that the first to fourth embodiments have describes the driving in which noise components are vertically transferred in an empty packet, but even if there are charges of color signal components in the empty packet, the packet is not treated in the signal processing, so that the same noise reduction effect as described above is, of course, obtained.

Note also that, in the first and fourth embodiments, as the main effect of noise components, empty packets include noise components such as smears and dark currents mixed in vertical transfer as described above, it is possible to cancel the smears and also the dark currents from image signals, with the same effect as described above.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

In thinning readout driving in vertical and horizontal directions, the solid-state imaging device of the present invention can obtain high-quality images whose noise is significantly reduced. The solid-state imaging device is especially suitable to be used in high-quality digital cameras and the like.

What is claimed is:
1. A solid-state imaging device comprising
a plurality of vertical transfer units each of which is arranged corresponding to each column of pixels and is operable to vertically transfer charges read out from the pixels, the pixels being arranged two-dimensionally by rows and columns;

a horizontal transfer unit operable to horizontally transfer the charges obtained from said vertical transfer units; and a driving unit operable to drive said vertical transfer units and said horizontal transfer unit, wherein, in a vertical final stage of said vertical transfer units, the transfer electrode structures in every m columns are the same, where m is an integer number equal to or more than 2, the vertical final stage being a vertical transfer stage located the closest to said horizontal transfer unit, in each vertical final stage of columns except one column of the m columns or of all columns of the m columns, there are transfer electrodes independent of the electrodes in the other columns in the m columns, and the independent transfer electrodes are driven independently to perform transfer processing from the corresponding vertical final stage to said horizontal transfer unit, the driving being independent from driving of the electrodes in the other columns in the m columns, and said driving unit is operable:

to perform sequential vertical transfer driving, by which first packets and second packets are sequentially and vertically transferred within one horizontal transfer period, each of the first packets including a signal component to be used as an image signal and each of the second packets not including any signal component to be used as an image signal;

to apply, in the sequential vertical transfer driving, respective transfer pulses to the transfer electrodes in the vertical transfer stage and transfer electrodes of said horizontal transfer unit, so that the first packets and the second packets are separated to be allocated into respective different horizontal transfer stages of said horizontal transfer unit; and to perform the sequential vertical transfer driving of the first packets and the second packets in the vertical final stage in one of the m columns so as to be different from that of an other column of the m columns.

2. The solid-state imaging device according to claim 1, wherein the number of the first packets allocated into one horizontal transfer stage of said horizontal transfer unit is equal to or less than m−1, as a result of the allocating of each of the first packets and each of the second packets into said horizontal transfer unit.

3. The solid-state imaging device according to claim 1, further comprising
a color filter corresponding to each pixel.

4. The solid-state imaging device according to claim 3, wherein said color filters are arranged in Bayer pattern.

5. A driving method in use for a solid-state imaging device that has at least a preview mode, as an image capture mode, by which pixels are thinned in vertical and horizontal directions,
wherein the solid-state imaging device includes vertical transfer units that vertically transfer charges read out from two-dimensionally arranged pixels, and a horizontal transfer unit that horizontally transfers the charges obtained from the vertical transfer units, and
wherein the vertical transfer units include a vertical final stage that is a vertical transfer stage located the closest to a horizontal transfer unit, and in which there are same transfer electrode structures in every m columns, where m is an integer number equal to or more than 2, said driving method comprising:

transferring first packets and second packets by the vertical transfer units, each of the first packets including a signal component in the charges read out from the pixels to be used as an image signal and each of the second packets not including any signal component to be used as an image signal;

transferring charges included in the second packets in the vertical transfer units in the columns, to respective predetermined horizontal transfer stages of the horizontal transfer unit;

transferring charges included in each of the first packets in the vertical transfer unit, to a horizontal transfer stage which is different from the predetermined horizontal transfer stage of the horizontal transfer unit;

controlling the vertical final stage so that the transfer of the first packets and the second packets to the horizontal transfer unit in one of the m columns is different from that in an other of the m columns; and horizontally transferring the charges in the respective horizontal transfer stages of the horizontal transfer unit, and obtaining an output signal.

6. The driving method according to claim 5,
wherein the charges included in each of the first packets and charges included in each of the second packets are added together in the vertical transfer units when the charges are read out from the pixels, and the added charges are transferred to the horizontal transfer unit.

7. The driving method according to claim 5,
wherein in the transferring of the charges included in each of the first packets, charges of a plurality of the first packets are sequentially transferred in the vertical transfer unit.

8. The driving method according to claim 5, further comprising
mixing the charges of each of the first packets and the charges of each of the second packets in the vertical final stage of the vertical transfer unit.

9. A camera comprising:
the solid-state imaging device according to claim 1;
an optical system including a lens which is operable to focus incident light from an object on an imaging area of said solid-state imaging device;
a control unit operable to control driving of said solid-state imaging device; and
an image processing unit operable to apply signal processing to an output signal from said solid-state imaging device.

10. The camera according to claim 9, further comprising
a memory in which the output signal is stored.

11. The camera according to claim 9,
wherein said image processing unit is operable to obtain a difference between signals which have a same signal component amount and have different noise components, and to cancel the noise components in the output signal using a signal component per one pixel which is calculated from the difference, and to obtain an image signal.

* * * * *